(12) United States Patent
Elsdon et al.

(10) Patent No.: US 12,209,880 B2
(45) Date of Patent: Jan. 28, 2025

(54) ENABLING A LOCAL MIXED REALITY MAP TO REMAIN DE-COUPLED FROM A GLOBAL MIXED REALITY MAP

(71) Applicant: Microsoft Technology Licensing, LLC, Redmond, WA (US)

(72) Inventors: Joshua Aidan Elsdon, Bellevue, WA (US); Marc Andre Leon Pollefeys, Zurich (CH); David John McKinnon, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 204 days.

(21) Appl. No.: 18/089,897

(22) Filed: Dec. 28, 2022

(65) Prior Publication Data

US 2024/0219197 A1   Jul. 4, 2024

(51) Int. Cl.
*G01C 21/00* (2006.01)
*G06T 19/00* (2011.01)

(52) U.S. Cl.
CPC .......... *G01C 21/3841* (2020.08); *G06T 19/00* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 2017/0243352 A1 | 8/2017 | Kutliroff | |
| 2020/0111267 A1* | 4/2020 | Stauber | G06F 3/011 |
| 2020/0193717 A1 | 6/2020 | Daly | |
| 2020/0210704 A1* | 7/2020 | Han | G06V 10/462 |
| 2022/0373697 A1* | 11/2022 | Ter Beest | G01S 19/485 |

FOREIGN PATENT DOCUMENTS

WO    2020069525 A1    4/2020

OTHER PUBLICATIONS

International Search Report and Written Opinion received for PCT Application No. PCT/US2023/080184, (MS#412529-PCT01) Mar. 5, 2024, 13 pages.

\* cited by examiner

*Primary Examiner* — Tize Ma
(74) *Attorney, Agent, or Firm* — Workman Nydegger

(57) ABSTRACT

Techniques for enabling a library of local maps to remain de-coupled from a global map are disclosed. An MR system is determined to be located on a platform that is currently moving or that has an ability to readily move. That platform's type is determined. Based on the determined type for the platform, a 3D boundary that approximates a shape for the platform's type is generated. The 3D boundary is imposed on the platform. Scanning data for the platform is acquired. The bounds for that scanning data is at least initially limited to that of the 3D boundary. The scanning data is used to build or supplement a library of local maps. The library is representative of the platform. That library is prevented from being coupled to a global map.

20 Claims, 29 Drawing Sheets

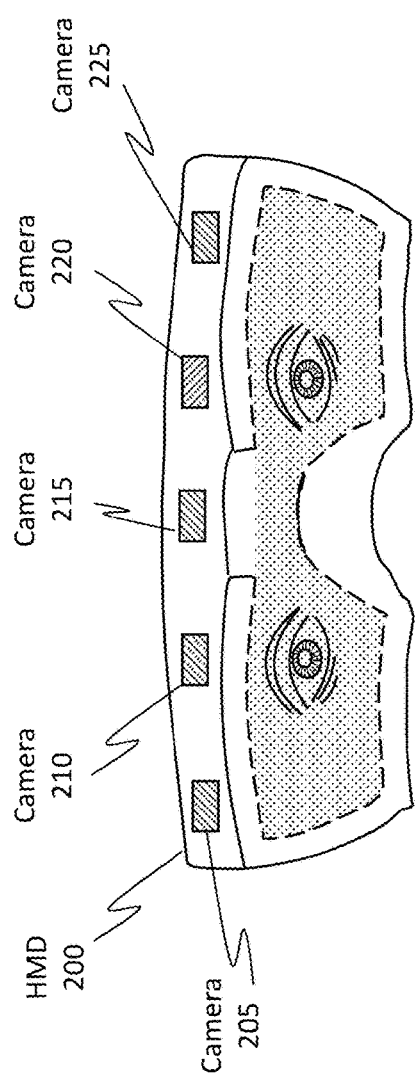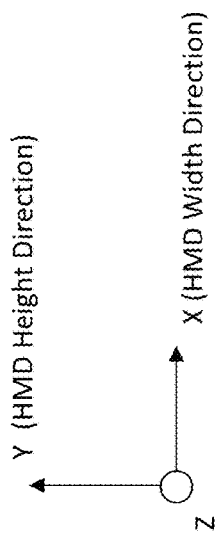
*Figure 2*

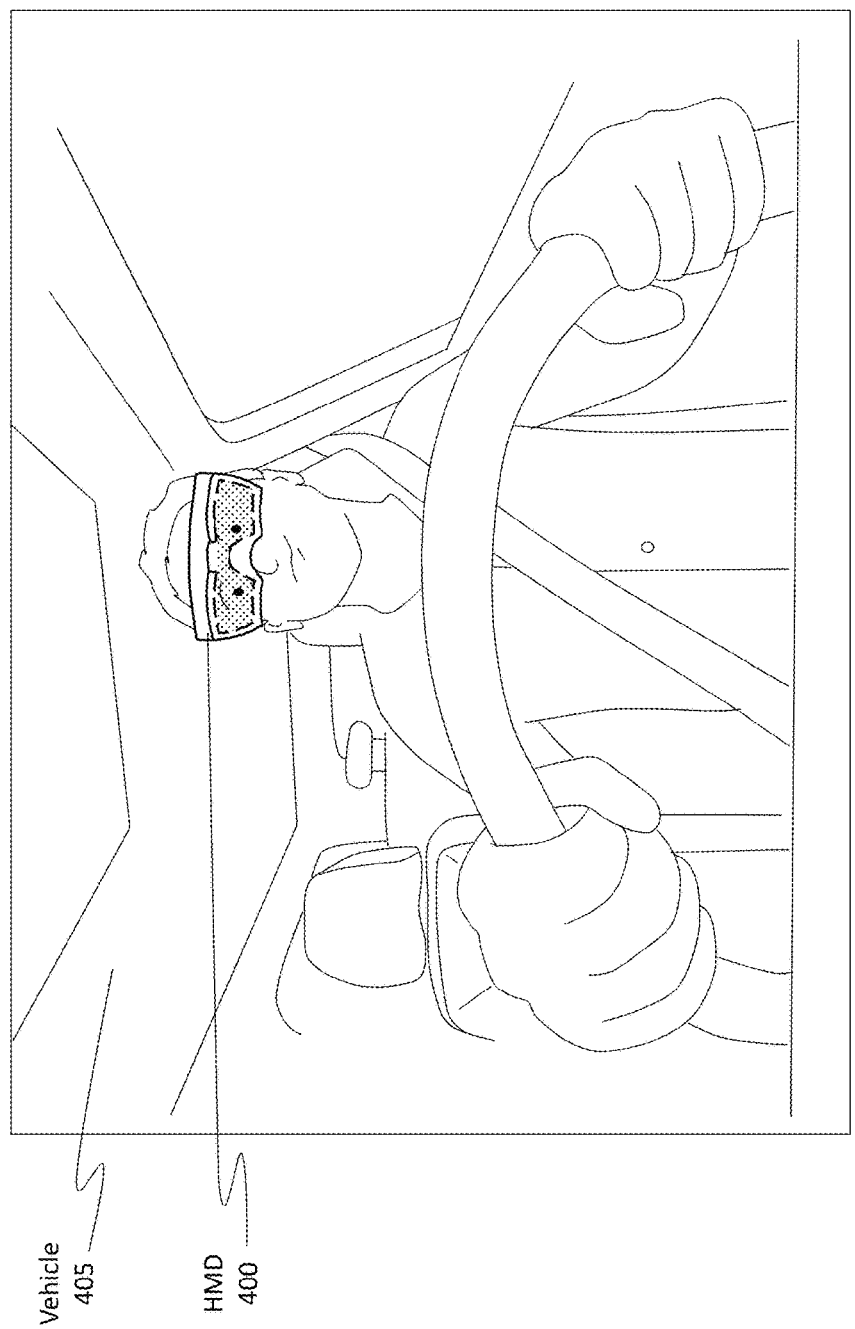
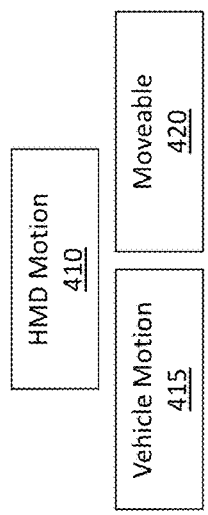
*Figure 4*

Use Motion Data Associated With The Platform To Determine A Type For The Platform — 2205

*Figure 22*

ENABLING A LOCAL MIXED REALITY MAP TO REMAIN DE-COUPLED FROM A GLOBAL MIXED REALITY MAP

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

An MR system can be used to display various different types of information to a user. Some of that information is displayed in the form of augmented reality or virtual reality content, which can also be referred to as a "hologram." That is, as used herein, the term "hologram" generally refers to image content that is displayed by the MR system. In some instances, the hologram can have the appearance of being a three-dimensional (3D) object while in other instances the hologram can have the appearance of being a two-dimensional (2D) object.

Often, holograms are displayed in a manner as if they are a part of the actual physical world. For instance, a hologram of a flower vase might be displayed on a real-world table. In this scenario, the hologram can be considered as being "locked" or "anchored" to the real world. Such a hologram can be referred to as a "world-locked" hologram or a "spatially-locked" hologram that is spatially anchored to the real world. Regardless of the user's movements, a world-locked hologram will be displayed as if it was anchored or associated with the real-world. A motion model, such as a Kalman filter, is typically used to facilitate the display of a world-locked hologram. A motion model is a type of transformation matrix that enables the projection of content to a known location or scene, despite various movements occurring.

In contrast, a field of view (FOV) locked hologram is a type of hologram that is persistently displayed at a particular location in the user's FOV regardless of any movement of the user's FOV. For instance, a FOV locked hologram may be persistently displayed in the upper right corner of the user's FOV.

To properly display a world-locked hologram, the MR system is tasked with gaining a spatial understanding of its environment. This spatial understanding is often achieved via use of the MR system's cameras and inertial measurement units (IMUs), which include various accelerometers, gyroscopes, and magnetometers. The MR system feeds the data generated from these subsystems to a motion model, which is then relied on to anchor the hologram to a position in the real world.

Therefore, to render holograms in an MR system, the position of the device in three-dimensional (3D) space is required. Rendering images from the perspective of this 3D location gives the user the impression that the holograms are located physically in their space. As mixed reality technology becomes available in more socially acceptable form factors, users will start to use the devices throughout the day at different locations. A typical day for most will include some travel in vehicles and perhaps even use in elevators or other types of moving platforms. These situations present a difficult problem for the internal mapping system of the mixed reality device.

In particular, as an MR device moves through the environment, it finds and tracks feature points using cameras mounted to the device. The combination of tracking these feature points and inertial measurements from an inertial measurement unit (IMU) allows the device to know where it is in three-dimensional space. This works well and is the status quo for tracking head mounted devices (HMD) in a so-called inside-out paradigm, where "inside-out" refers to the fact that the cameras are on the device and are outwardly observing the environment. The set of these points is stored such that they can be recalled if the user returns to this location, or if the user wants to start tracking in this location the next time that user turns the device on. This set of points is called "the map".

Tracking on a moving platform can be problematic, however. In particular, the MR device attempts to compensate for the fact that the platform is moving, though the output is the same. The MR device will output a trajectory of the headset and keep a map of the interior of the platform. This map can be used in all the same ways that a stationary map would be used; however, the boundary between this map and the "stationary map" of the rest of the world (aka a "global" map) causes some issues. It is worthwhile to note that the MR system is generally not able to calculate the exact trajectory of the moving platform, as there is not enough reliable data that can be captured from just outward facing cameras and the IMU.

At this point, an example may be helpful. Consider a scenario where an MR device is tracking successfully on the sidewalk of a street. The MR device has built a map of this area and is submitting and receiving information from a centralized mapping server (e.g., a map aggregator) shared between many users. This map is therefore tied rigidly to "the world" and is an example of the global map. When the user enters a stationary vehicle, the scanning data for that stationary vehicle is also added to the map. When the vehicle starts to move, however, the MR system's tracker will attempt to compensate for this movement. Without sophisticated external sensors (e.g., high quality GPS, some self-tracking from the vehicle, or other tracking techniques), tracking the device's location in the world becomes untenable. The best the MR device or MR system can do is compensate for the motion and continue tracking relative to the inside of the vehicle. However, the previously mapped exterior environment is still a part of this map.

The user may drive a significant distance and then stop. Now, the tracker does not need to compensate for vehicle motion. However, the map now consists of the inside of the vehicle, which it is using successfully, and the old exterior environment, which is not valid in this new location. When the user exits the vehicle, the tracker will try to find the old features from the previous location and may even try to display the holograms that were previously displayed in the old location. This will cause severe tracking problems. The best-case scenario is that the device will continue to build a map on top of the old map section, superimposing two sets of scenery on top of each other. After some time, the old points may eventually be purged.

In any event, in this scenario, the map will become corrupted and will lead to low quality tracking. Even further, all mapping data that this device is collecting will be incompatible with the shared central mapping system (i.e. the map aggregator). Any submissions the device makes will corrupt the centralized map, and any information read will seem incorrect to the device. There is a substantial need, therefore, to improve how MR systems scan and track position, particularly when those MR systems are located on a moving platform.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for enabling a library of one or more local maps to remain de-coupled from a global map.

Some embodiments determine that a mixed-reality (MR) system is located on a platform that is currently moving or that has an ability to readily move. The embodiments determine a "type" or "category" for the platform.

Optionally, some embodiments use motion data associated with the platform to determine the platform's type. Some other embodiments acquire at least a threshold amount of scanning data, where this scanning data is representative of at least a portion of the platform. Based on the acquired scanning data, these embodiments then determine the type for the platform.

Regardless of how the type is determined, the embodiments generate, based on the determined type for the platform, a three-dimensional (3D) boundary that approximates a shape for the platform's type. The embodiments then impose the 3D boundary onto the platform. Scanning data that is representative of one or more portions of the platform is acquired. Notably, the bounds for this scanning data is at least initially limited to that of the 3D boundary. The embodiments use the scanning data to then build or supplement a library of one or more local maps. The library of one or more local maps is representative of the platform. The embodiments prevent this library from being coupled to a global map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2 illustrates another configuration of an HMD.

FIG. 4 illustrates an example of a moving platform.

FIGS. 20, 21, and 22 illustrate various flowcharts of an example method for enabling a local map to remain independent of a global map.

DETAILED DESCRIPTION

Figure 1:
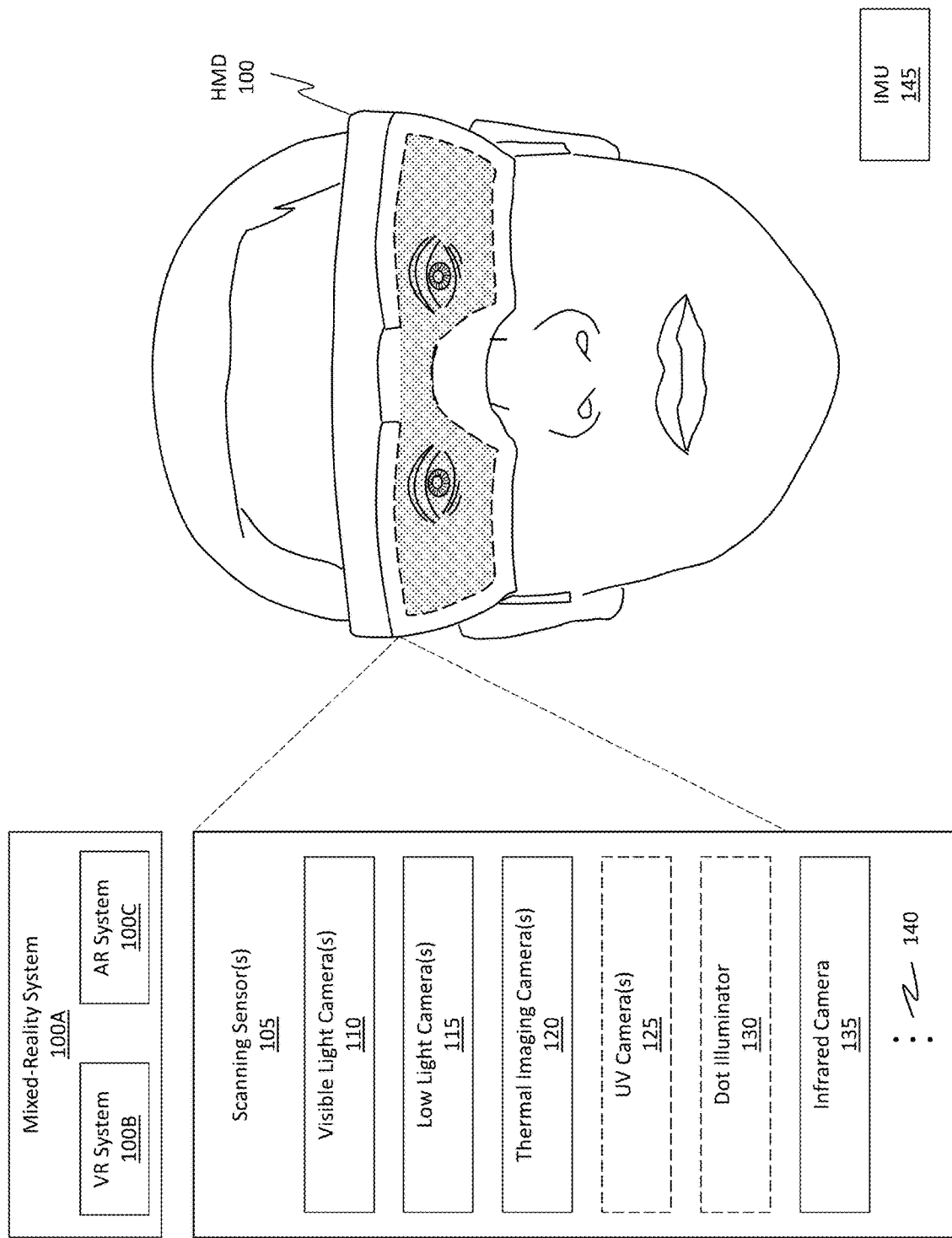
FIG. 1 illustrates an example head mounted device (HMD) configured to perform the disclosed operations.

Embodiments disclosed herein relate to systems, devices, and methods for enabling a library of one or more local maps to remain de-coupled from a global map.

Some embodiments determine that a mixed-reality (MR) system is located on a platform that is currently moving or that has an ability to readily move. Various different operations can then be performed to determine the platform's type.

For instance, some embodiments are able to directly determine the platform's type. Some embodiments use motion data associated with the platform to determine the platform's type. Some embodiments acquire at least a threshold amount of scanning data, where this scanning data is representative of at least a portion of the platform. Based on the acquired scanning data, these embodiments then determine the type for the platform.

Regardless of how the type is determined, the embodiments generate, based on the determined type for the platform, a three-dimensional (3D) boundary that approximates a shape for the platform's type. The embodiments then impose the 3D boundary onto the platform. Scanning data for the platform is acquired. Notably, the bounds for the scanning data is at least initially limited to that of the 3D boundary. The embodiments use the scanning data to build or supplement a library of local maps. The library is representative of the platform. The embodiments prevent the library from being coupled to a global map.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments beneficially de-link, de-couple, or rather prevent maps that are generated for a moving platform from being linked to maps that are global, such as the stationary map mentioned earlier. In doing so, the embodiments will significantly improve the MR system's tracking and hologram display operations. Furthermore, the user's experience with the MR system will be significantly improved because the quality of displaying the hologram will be improved.

In particular, when an MR device detects that it is inside a moving vehicle, the embodiments can perform various different beneficial actions. For instance, the embodiments can start a new map that is initialized with a limited set of points from the old map. The limited points can optionally be points that are currently in view or can be points that are within a certain distance of the MR system's current location. This new map is a "local" map. Optionally, a centralized mapping service can be queried to potentially obtain special moving platform map templates, which can include a corpus of pre-configured maps or map templates. As an example, these templates can include a map of an interior of a vehicle. Optionally, the maps can be crowd-sourced maps of specific vehicles or other platforms.

Context can also be considered when generating a local map. For example, if a moving event happens on the platform of a train station, the relevant trains that might be at that location at that particular time can be queried as a priority. Alternatively, if a user owns a car, that user's specific car can be mapped and recalled preferentially.

In the case where there is no sufficiently close match, a new "moving platform" map (aka a "local" map) can be registered with the centralized service. The MR device can then start submitting map segments to the service.

The service will know that none of the moving platform maps are to be connected to the "world" or "global" map in a permanent manner. That is, these disconnected "local" maps will exist as independent islands in the map aggregation system.

The MR device can estimate the platform's type. With the type known or selected, the MR device can then define a maximum bounds for the special moving platform map. For example, a train may be identified. The embodiments can then initialize a three-dimensional (3D) boundary in the shape of a long cylinder that approximates the shape of the train. A generic car shape might be matched to a new car local map.

Beneficially, the 3D boundary's shape can be expanded when there is significant confidence that a point outside of it is in fact part of the platform. For example, on a large ship, a user wearing an MR system may enter a new room. The MR system's tracker will determine that the MR device is still on a moving platform due to the residual movements detected (i.e. the movements of the ship, as determined by the MR system's IM/U). Therefore, all the points in the new room will be included in the local map for the ship, and the 3D boundary for that local map will be expanded to at least include this new room.

Contextually, the MR system may know that a car is of a bounded size. Thus, when a feature is observed through the window of a parallel travelling car, the MR system can discern that the bounds of the car should not be expanded to include this adjacent car. Thus, the embodiments employ various intelligence in determining when and how to expand the size of the 3D boundary.

In some cases, the maximum extent, bounds, or confines of the bounding region (i.e. the 3D boundary) can be fixed for certain platform types, such as vehicles. For example, to help differentiate each carriage of a train, the embodiments may treat each segment as a different vehicle. When the tracking system detects that the platform/vehicle is at rest, the system can continue to use the moving platform map until the user/MR system exits the calculated bounds of the moving platform map. Doing so allows the mapping system to continue to add detail to the moving platform map (i.e. the local map), even if certain areas of the map are observed only when stationary (e.g., hallways of trains, a rear seat of a car, etc.). Similarly, if the vehicle is at constant velocity, the cameras and IMU may not be able to tell the vehicle is moving (e.g., as only accelerations are truly visible to some tracking systems). If the MR system is still inside the bounding box, however, the embodiments can continue to use only the moving platform map (i.e. the local map).

When the MR system exits the bounds of the moving platform map and when the tracker detects that the environment is at rest, the MR device can assume that it has exited the vehicle and now is back in the world. The MR device can now query the central mapping system to be relocated within the world map (i.e. a localization process). The mapping service will compare features that are found outside of the bounds of the moving platform with features stored on the server. If it finds a match, the device will be told its world location, and it will begin participating in the crowd mapping process with the mapping service.

If no match is found, the device and the mapping service will build a new stationary map segment. This new segment (i.e. a part of the global map) is different from a new moving platform segment (i.e. the local map), as the service will be allowed to connect this segment to the broader "world" map once adequate correspondences have been found. If, at a later time, the environment is detected to be moving, then this new stationary map can be converted to a moving platform map, and it will no longer be allowed to join the global or world map.

Map updates might be applied to the centralized mapping service only if the matching moving platform map was found in the database. By performing these various operations, the disclosed embodiments significantly improve how MR systems operate and display holograms when those MR systems are located on moving platforms.

Although a majority of the examples provided herein are directed to MR systems and HMDs, a skilled person will recognize how the disclosed principles can be practiced in other environments or contexts. For instance, the principles can be employed for use with robotic agents that are tasked with making maps. The principles can also be employed with drones that operate inside of moving platforms as well. Furthermore, the principles can be employed using mobile phones, tablets, or any other handheld device that enables MR experiences. Thus, it should be appreciated that throughout this disclosure, the various references to MR system can be interchanged with drones, robots, or even mobile devices. Accordingly, these and numerous other benefits will now be discussed in more detail throughout the remaining portions of this disclosure.

Example MR Systems and HMDs

Attention will now be directed to FIG. 1, which illustrates an example of a head mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. For instance, the disclosed operations can optionally be performed by a cloud service that is communicating with an HMD.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment. Scanning sensor(s) 105 may comprise any number or any type of scanning device, without limit.

In some embodiments, scanning sensor(s) 105 include visible light camera(s) 110, low light camera(s) 115, thermal imaging camera(s) 120, potentially (though not necessarily, as represented by the dotted box in FIG. 1) ultraviolet (UV) camera(s) 125, potentially (though not necessarily, as represented by the dotted box) a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras. HMD 100 is further shown as including an inertial measurement unit (IMU) 145. Further details on this feature will be provided shortly.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras. Any one of those cameras can be referred to as a "system camera."

Figure 3:
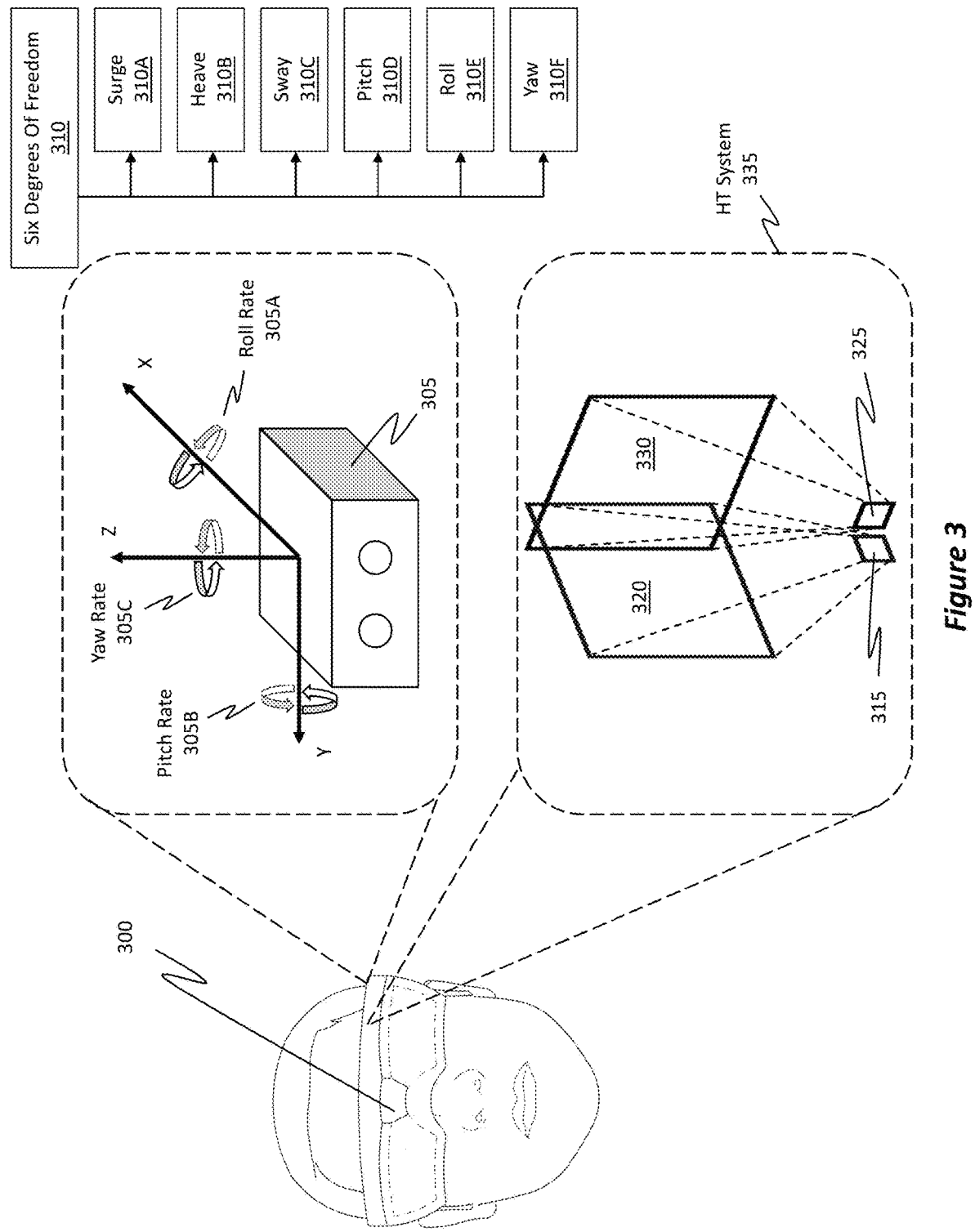
FIG. 3 illustrates how an HMD can include an inertial measurement unit (IMU).

FIG. 3 illustrates an example HMD 300 that is representative of the HMDs and MR systems discussed thus far. The descriptions "MR device" and "MR system" can be used interchangeably with one another. In some cases, HMD 300 is itself considered as an MR device. Therefore, references to HMDs, MR devices, or MR systems generally relate to one another and may be used interchangeably.

In accordance with the disclosed principles, HMD 300 is able to stabilize the visual placement of any number of holograms (e.g., 1, 2, 3, 4, 5, 10, 20, 30, 40, 50, or more than 50 holograms) rendered by the display of HMD 300 using IMU data and a motion model. This stabilization may occur even when certain position data, which is used for the visual placement, has conflicts or conflicting information as a result of it being collected while the HMD 300 was operating in a moving environment.

HMD 300 is shown as including an IMU 305, which is representative of the IN/U 145 from FIG. 1. IMU 305 is a type of device that measures force, angular adjustments/rates, orientation, acceleration, velocity, gravitational forces, and sometimes even magnetic fields. To do so, IMU 305 may include any number of data acquisition devices, which include any number of accelerometers, gyroscopes, and even magnetometers.

IMU 305 can be used to measure a roll rate 305A, a pitch rate 305B, and a yaw rate 305C. The IMU 305 can be used to measure the sum of gravitational acceleration and body acceleration in an inertial frame. IMU 305 can also measure angular rate as well as potentially an absolute orientation. It will be appreciated, however, that a motion sensor, which can include the IMU 305, can measure changes in any of the six degrees of freedom 310. Six degrees of freedom 310 refers to the ability of a body to move in three-dimensional space. As an example, suppose HMD 300 is operating in the cockpit of an airplane rolling along a runway. Here, the cockpit may be considered as a "first" environment and the runway may be considered as a "second" environment. The first environment is moving relative to the second environment. Regardless of whichever environment HMD 300 is operating within, the movements of one environment relative to another environment (as recorded or monitored by at least some of HMD 300's data acquisition devices) can be detected or measured in any one or more of the six degrees of freedom 310.

Six degrees of freedom 310 include surge 310A (e.g., forward/backward movement), heave 310B (e.g., up/down movement), sway 310C (e.g., left/right movement), pitch 310D (e.g., movement along a transverse axis), roll 310E (e.g., movement along a longitudinal axis), and yaw 310F (e.g., movement along a normal axis). Relatedly, 3DOF characteristics include only the pitch 310D, roll 310E, and yaw 310F. The embodiments are able to use 6DOF information or 3DOF information.

Accordingly, IMU 305 can be used to measure changes in force and changes in movement, including any acceleration changes of HMD 300. This collected data can be used to help determine a position, a pose, and/or a perspective of HMD 300 relative to its environment. To improve the position and pose determinations, the data generated by IMU 305 can augment or supplement data collected by a head tracking (HT) system. The pose information is used to display holograms in the scene.

FIG. 3 also shows a first HT camera 315, with its corresponding field of view (FOV) 320 (i.e. the observable area of HT camera 315, or rather the observable angle through which HT camera 315 is able to capture electromagnetic radiation), and a second HT camera 325, with its corresponding FOV 330. While only two HT cameras are illustrated, it will be appreciated that any number of HT cameras may be used on HMD 300 (e.g., 1 camera, 2, 3, 4, 5, or more than 5 cameras). Furthermore, these cameras may be included as a part of a HT system 335 implemented on HMD 300.

HT cameras 315 and 325 can be any type of HT camera. In some cases, HT cameras 315 and 325 may be stereoscopic HT cameras in which a part of FOVs 320 and 330 overlap with one another to provide stereoscopic HT operations. In other embodiments, HT cameras 315 and 325 are other types of HT cameras. In some cases, HT cameras 315 and 325 are able to capture electromagnetic radiation in the visible light spectrum and generate visible light images. In other cases, HT cameras 315 and 325 are able to capture electromagnetic radiation in the infrared (IR) spectrum and generate IR light images. In some cases, HT cameras 315 and 325 include a combination of visible light sensors and IR light sensors. In some cases, HT cameras 315 and 325 include or are associated with depth detection functionalities for detecting depth in the environment.

Accordingly, HMD 300 is able to use display positioning information generated by IMU 305 and display positioning information generated by HT system 335 to determine HMD 300's position and pose. This position and pose information will then enable HMD 300 to accurately render a hologram within an MR scene provided by HMD 300. For instance, if a hologram is to be fixedly displayed on a wall of a room, then the position and pose of HMD 300 are used during the hologram's placement operation to ensure that the hologram is rendered/placed at the proper wall location.

More specifically, to complete the hologram placement operation, the information from the HT cameras and the information from the IMU(s) can be combined using a motion model, such as a Kalman filter, to provide robust head tracking position and pose estimation and to perform hologram placement using the position and pose information. As used herein, a "Kalman" filter is a type of combining algorithm in which multiple sensor inputs, which were collected over a defined time period and which were collected using the IMU(s) and HT cameras, are combined together to provide more accurate display positioning information than that which could be achieved by either sensor alone. This combination may occur even in the face of statistical noise and/or other inaccuracies. This combined data is what is used during hologram placement.

Moving Platforms

Figure 5:
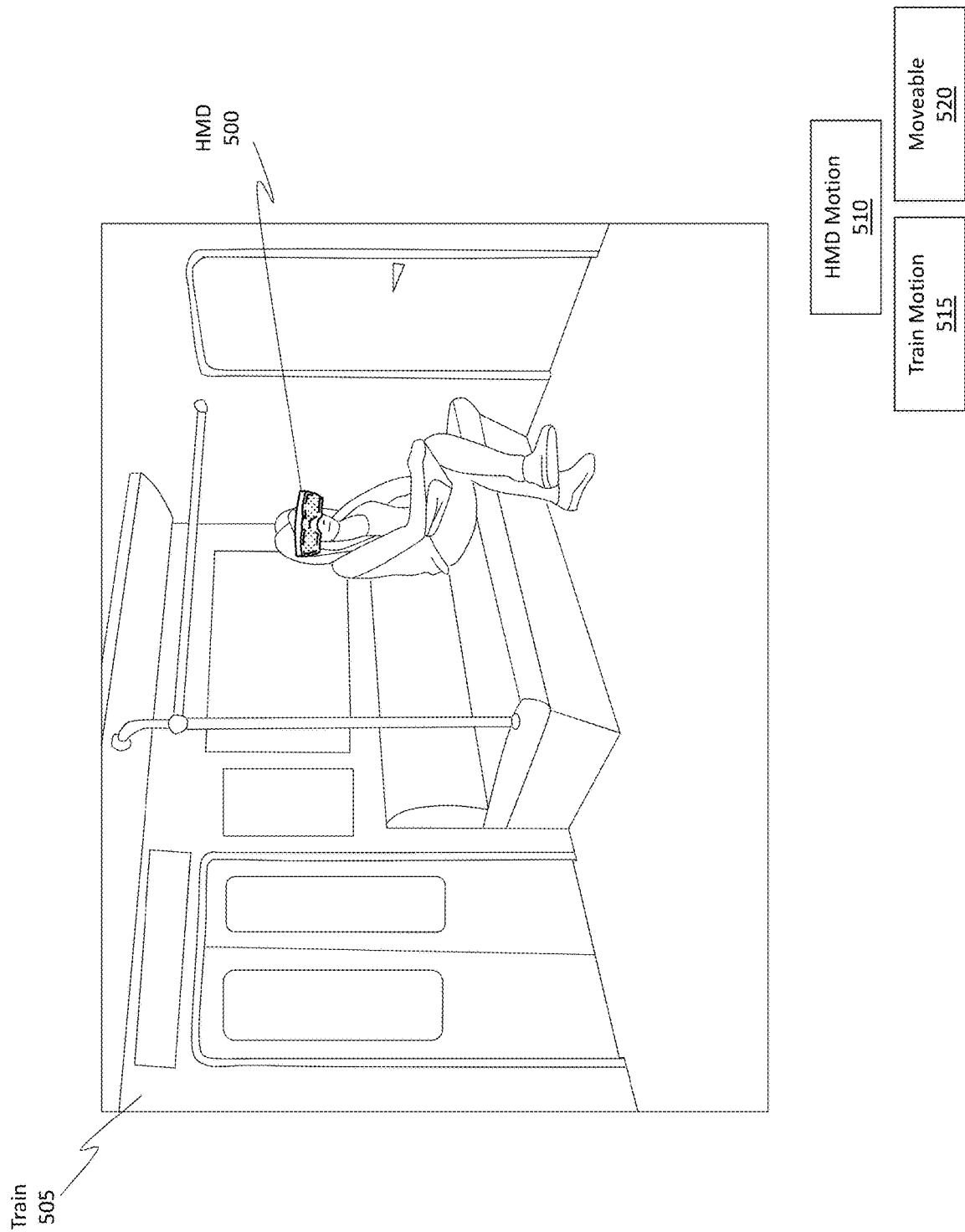
FIG. 5 illustrates another example of a moving platform.

Attention will now be directed to FIGS. 4 and 5, which show various examples of how a head mounted device (HMD)/MR system can be located on a moving platform. The HMD can move, and the moving platform can move. As used herein, HMD and MR system can be used interchangeably.

FIG. 4 shows an example HMD 400 located within the confines of a moving platform or a platform that is readily capable of movement; in this case a vehicle 405. It should be noted how the HMD can move, as shown by HMD motion 410, and how the vehicle 405 can move, as shown by vehicle motion 415.

It should further be noted that while the vehicle 405 does not constantly move, it is a platform that is readily moveable 420. By "readily" it is meant that the platform can move with little to no hesitation, delay, or difficulty. A plane, ship, train, and vehicle are examples of platforms that can move readily. Any type of moveable, enclosed (or mostly enclosed) platform can be used. A building, on the other hand, cannot move "readily." That is, even though a building might be able to move, such as in response to an earthquake, a building should not be viewed as being "readily" moveable. Thus, even though a platform might not be currently moving, if that platform can be readily moveable, then the embodiments are able to perform various operations in order to de-couple the local map generated for that readily moveable platform from a global map.

It should also be noted how the HMD's IMU does not distinguish between the HMD's movements and the vehicle's movements, so the IMU generates data that reflects a "convoluted" combination of the HMD's movements and the vehicle's movements. As a simplistic example, the HMD movement signal might have a higher frequency than the vehicle movement signal, so the HMD movement signal can be thought of as riding on the carrier wave of the vehicle movement signal.

FIG. 5 shows another example scenario. In FIG. 5, HMD 500 is located on a train 505. HMD 500 can move, as shown by HMD motion 510, and the train 505 can move, as shown by train motion 515. In this case, even when the train 505 is not actively moving, it is still considered to be a platform that is moveable 520. The IMU in this scenario also generates a set of convoluted motion data.

Moveable Platforms and Hologram Display

FIGS. 6, 7, 8, 9, 10, and 11 illustrate various problems with the traditional technology in which maps could not be disconnected from one another (i.e. there was only a single global map). The disclosed embodiments provide improvements over the traditional technology by enabling independent maps to exist without being coupled, linked, or connected to other maps.

Figure 6:
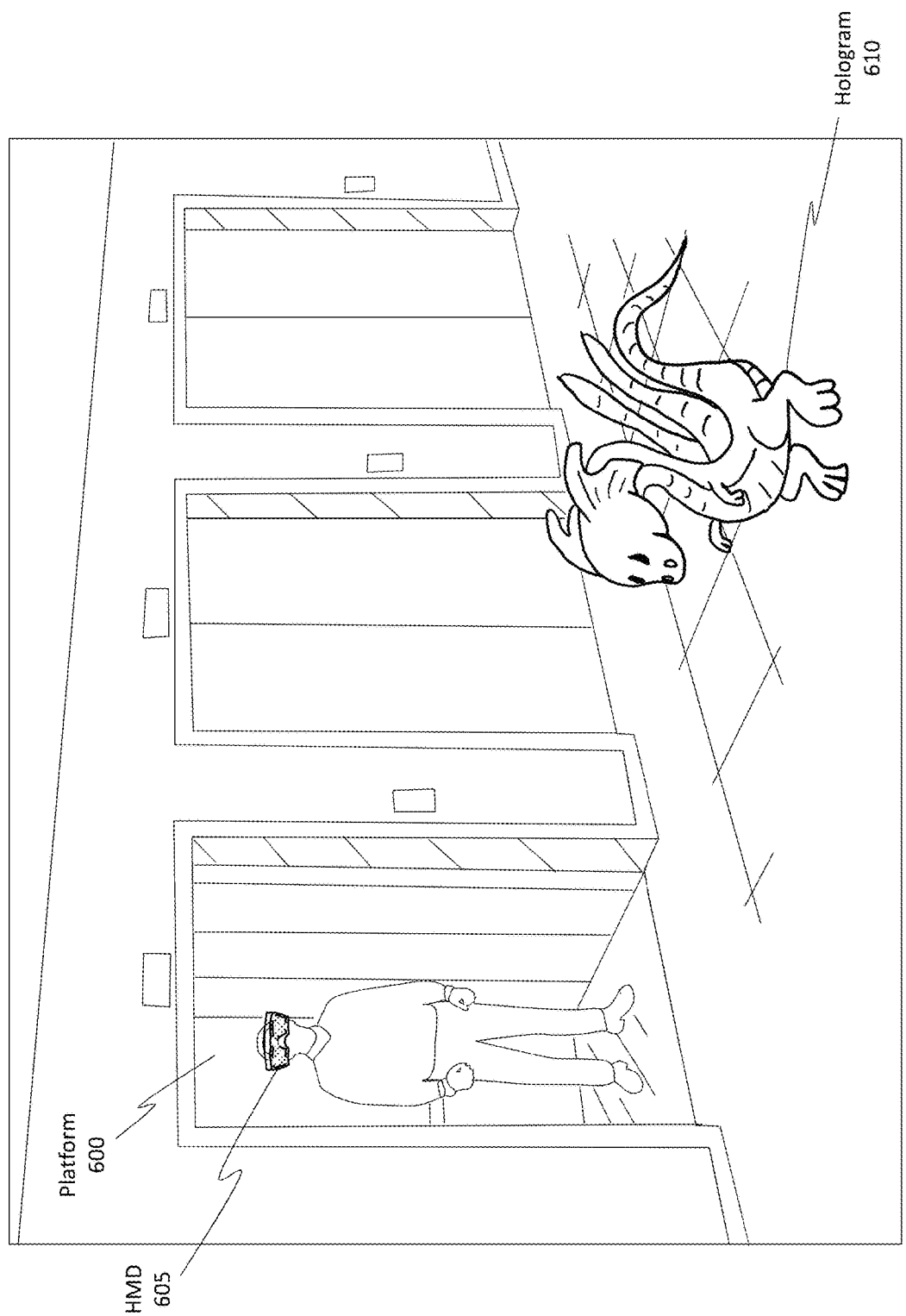
FIG. 6 illustrates how holograms can be displayed.

FIG. 6 shows a moveable platform 600 in the form of an elevator. A user is currently wearing an HMD 605, which is an example of an MR system. The HMD 605 is shown as displaying a hologram 610 in the real world.

Figure 7:
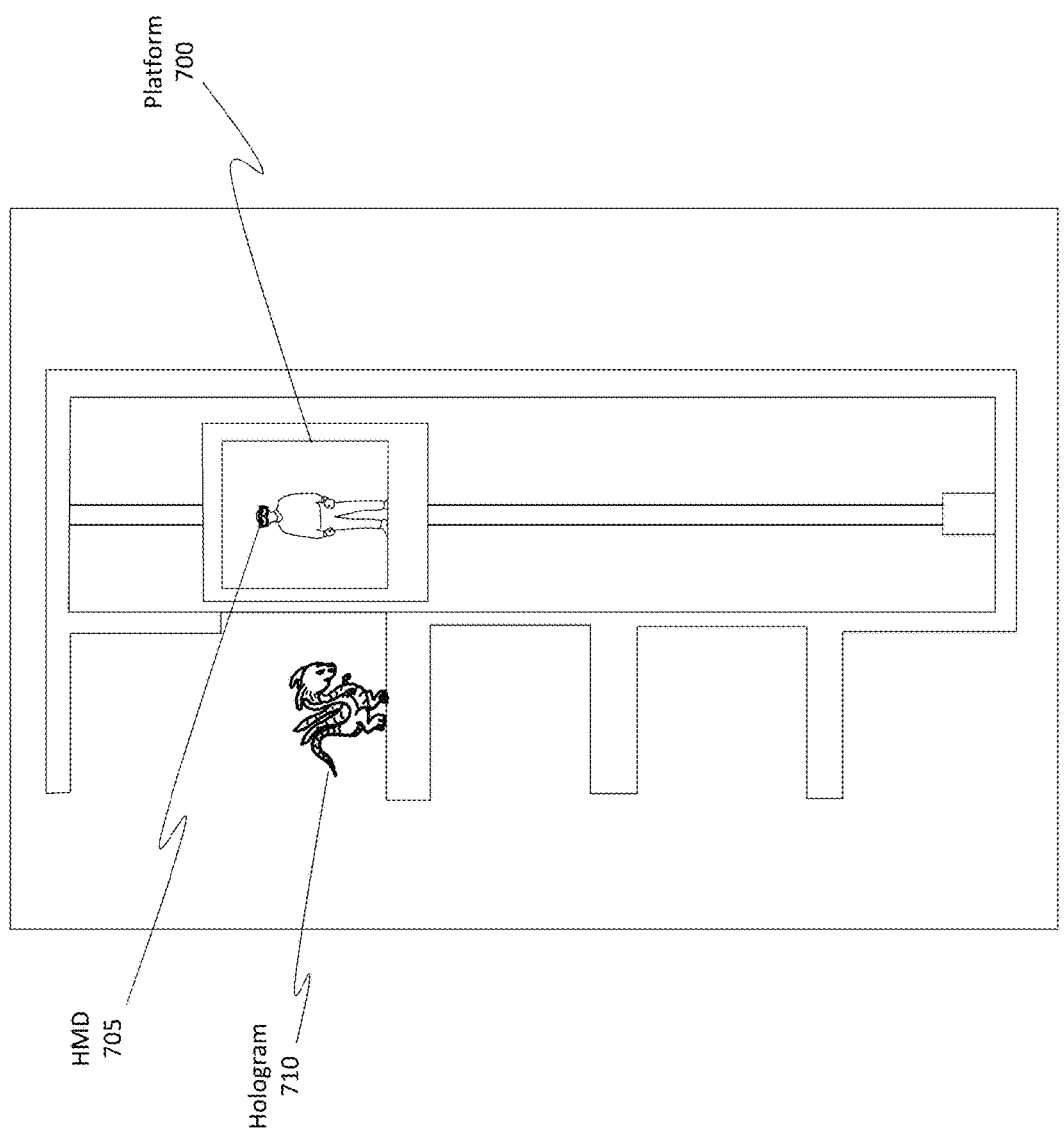
FIGS. 7, 8, and 9 illustrate how various problems can arise when displaying holograms using maps and how those problems originate because of a moving platform.
Figure 8:
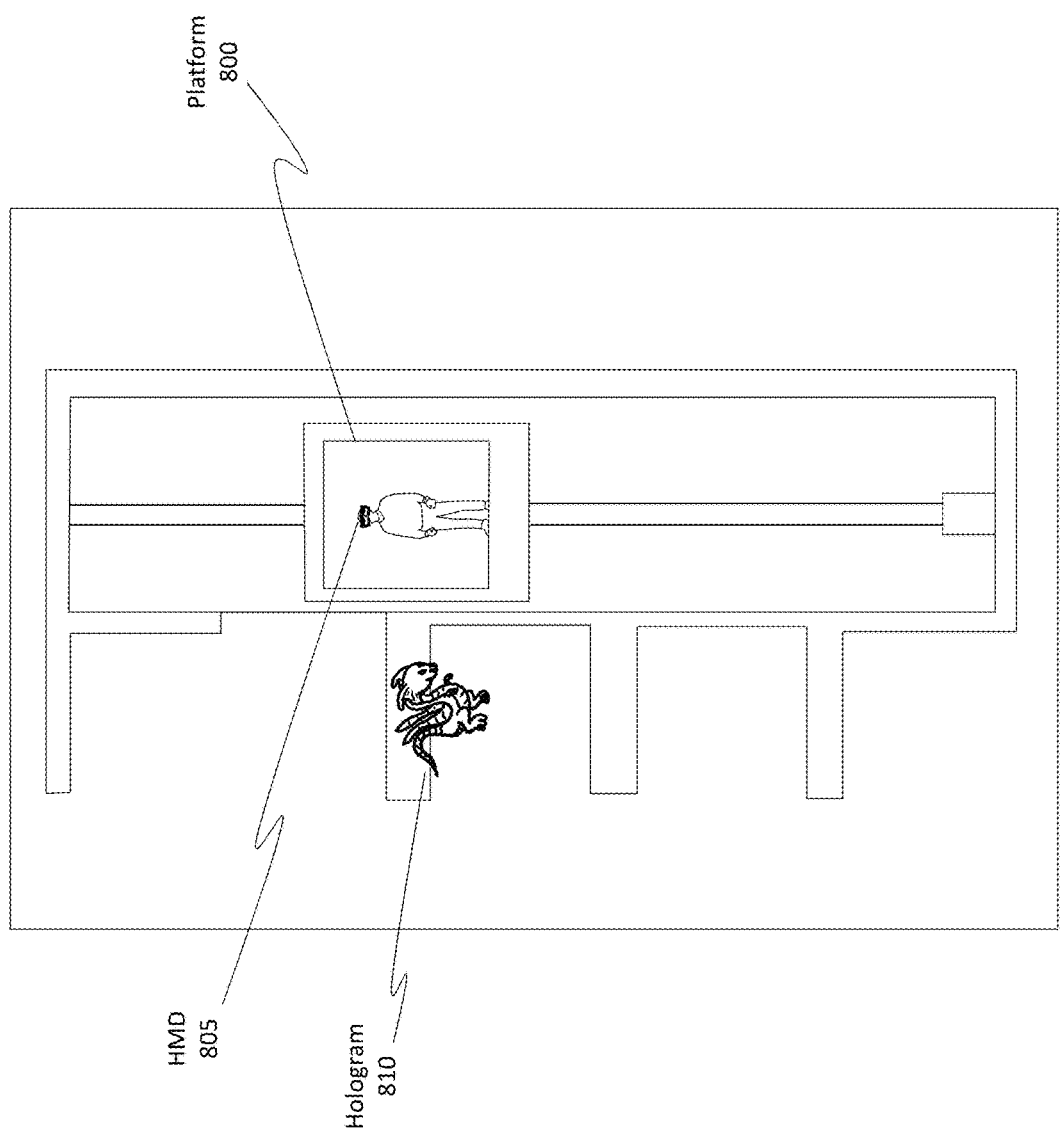
Figure 9:
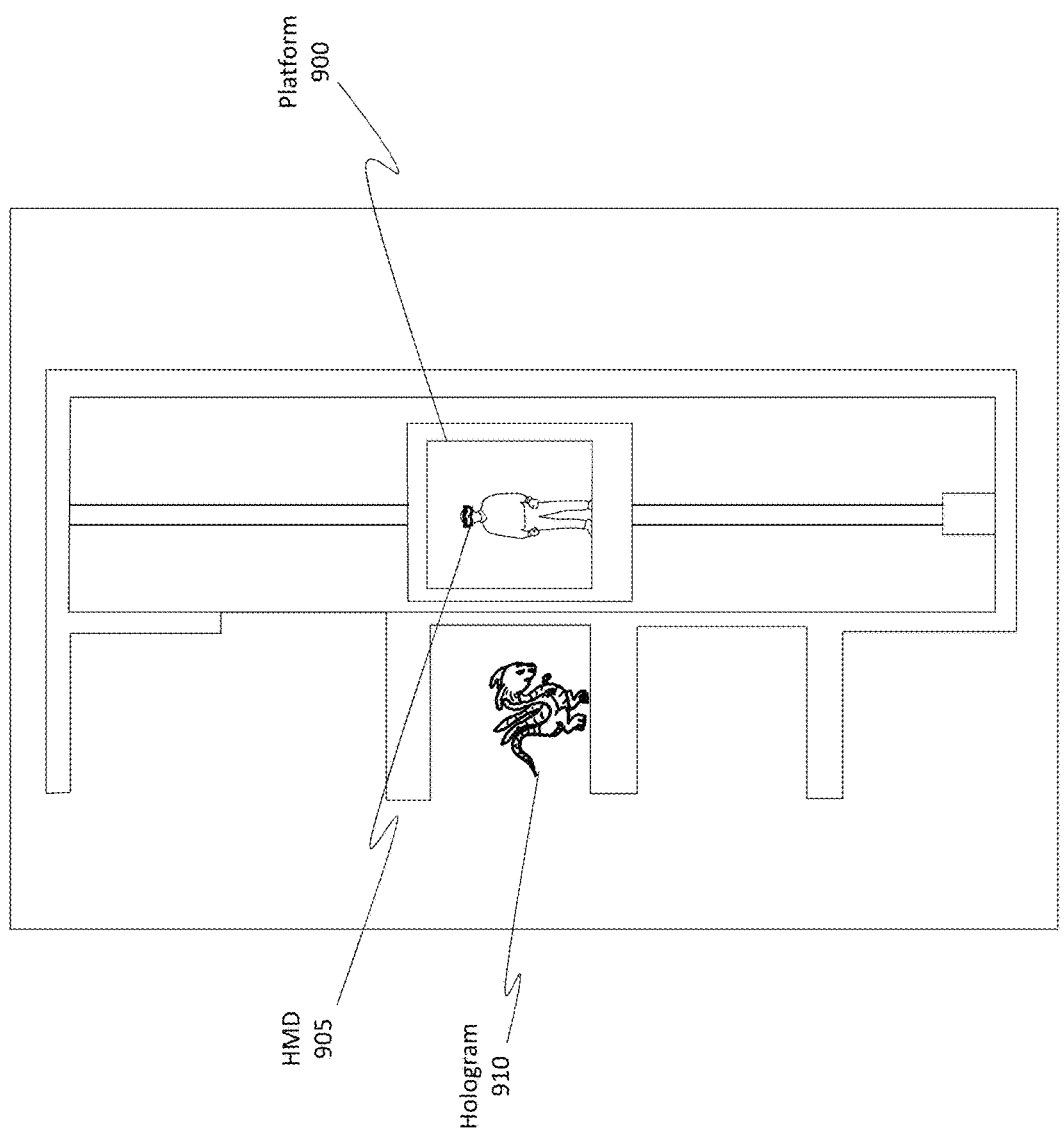

FIG. 7 shows the same platform 700, HMD 705, and hologram 710 as was shown in FIG. 6. The hologram 710 was a world-locked hologram, so it should remain on the fourth floor of the building. FIGS. 8 and 9, however, show how that may not always be the case.

FIG. 8 shows how the platform 800 is now moving. The HMD 805 is in the platform 800. The hologram 810, although perhaps not currently displayed (because it is on the other side of the closed elevator door), is shown as following the movement of the platform 800 even though it should remain on the fourth floor. The hologram follows the movement of the platform because the MR system does not understand that the platform is moving the MR system to a new environment.

FIG. 9 shows how the platform 900 is now located on floor three of the building. The HMD 905 and hologram 910 are similarly positioned.

Figure 10:
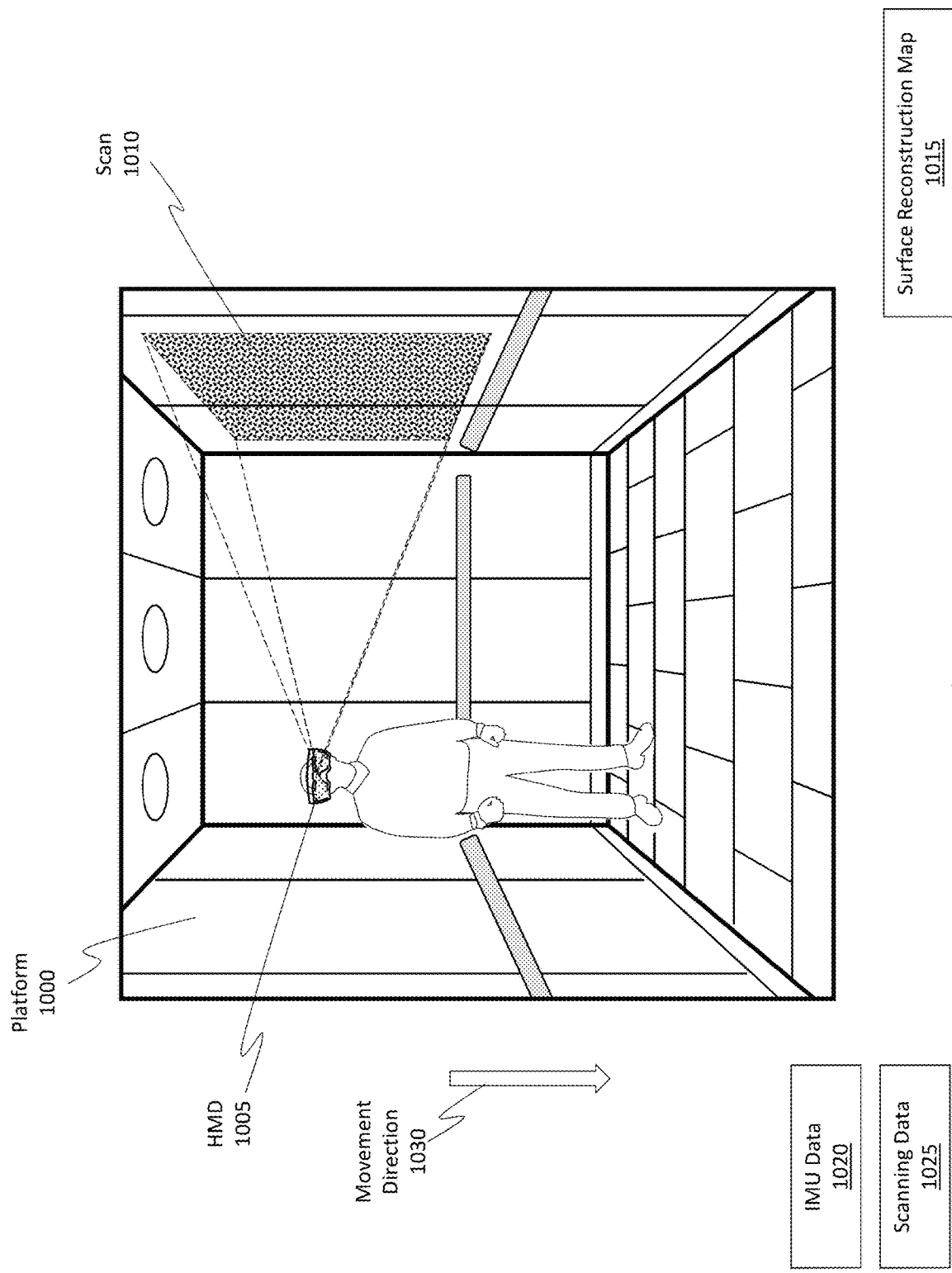
FIG. 10 illustrates an example where an HMD is scanning a platform.

FIG. 10 shows the inside of the platform/elevator while it was moving. In particular, FIG. 10 shows the platform 1000 and the HMD 1005. The HMD 1005 is currently scanning the inside of the elevator 1010 to generate a surface reconstruction map 1015 (or simply "map") for the platform 1000. The map is generated using one or a combination of IMU data 1020 and scanning data 1025 (e.g., image data). FIG. 10 also shows the movement direction 1030 of the platform 1000.

Figure 11:
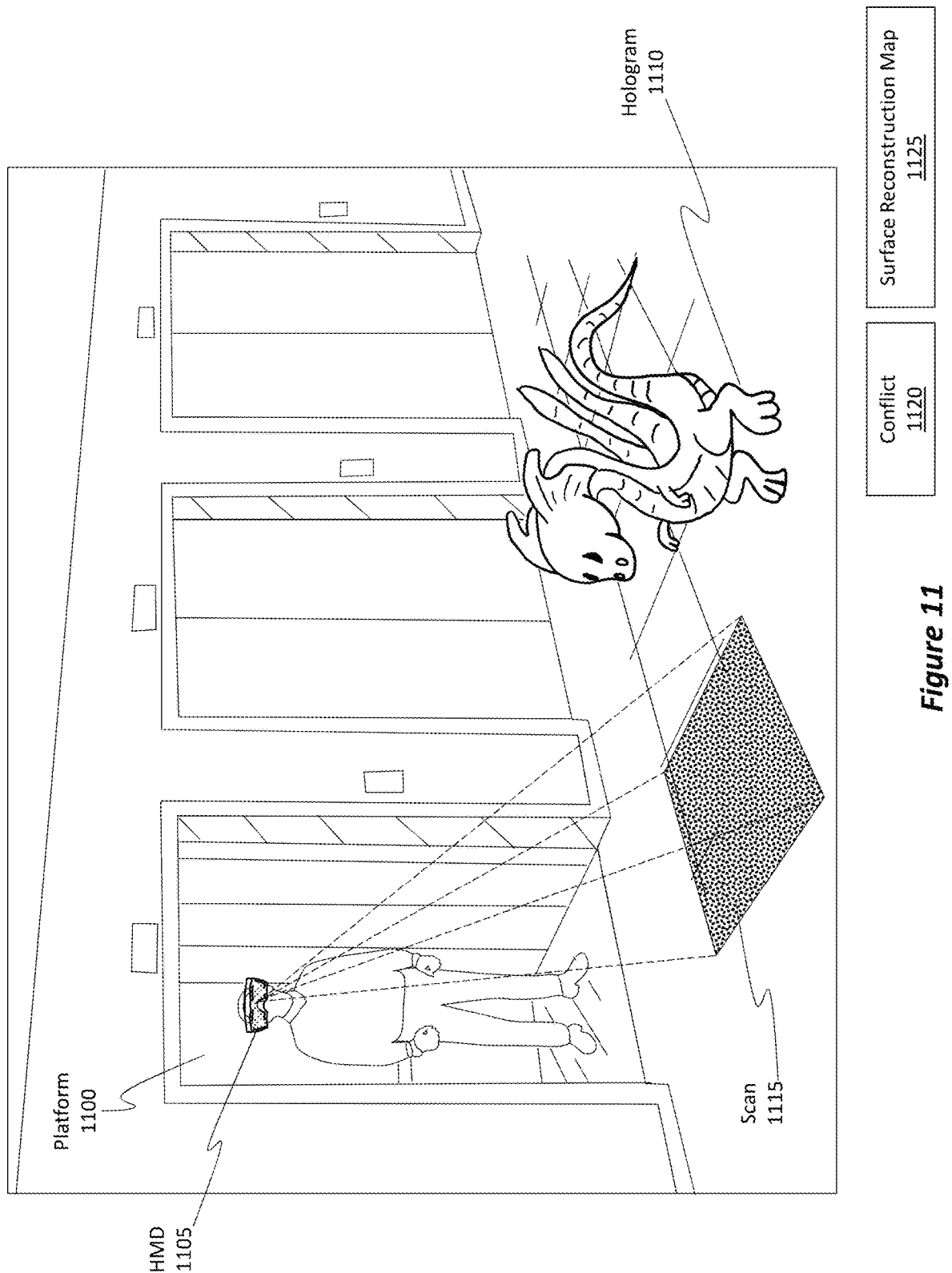
FIG. 11 illustrates another example where the HMD is scanning an area.

FIG. 11 shows the scenario that was described in FIG. 9 where the platform has reached the third floor. Now, the doors of the elevator are opened.

FIG. 11 shows the platform 1100 and the HMD 1105. FIG. 11 also shows how the hologram 1110 is displayed even though the hologram 1110 should be displayed only when the HMD 1105 is located on the fourth floor. Such a scenario occurred because the traditional scanning techniques failed to account for moving platforms. In some scenarios, the hologram might not be displayed. With traditional systems, many or most moving platforms will not be able to provide detailed global tracking information. For instance, it is assumed that there is no special system inside of the platform to indicate to the HMD the platform's current position, velocity, or acceleration. Now, the HMD 1105 is performing a scan 1115 of the third floor and is trying to merge the new scan data with the scan data from the fourth floor. Such a scenario results in a conflict 1120 between the various different surface reconstruction maps (e.g., surface reconstruction map 1125), as discussed previously. What is needed, therefore, is a technique for "breaking" or de-coupling maps so that conflicting data is not generated.

Example Architectures

Figure 12:
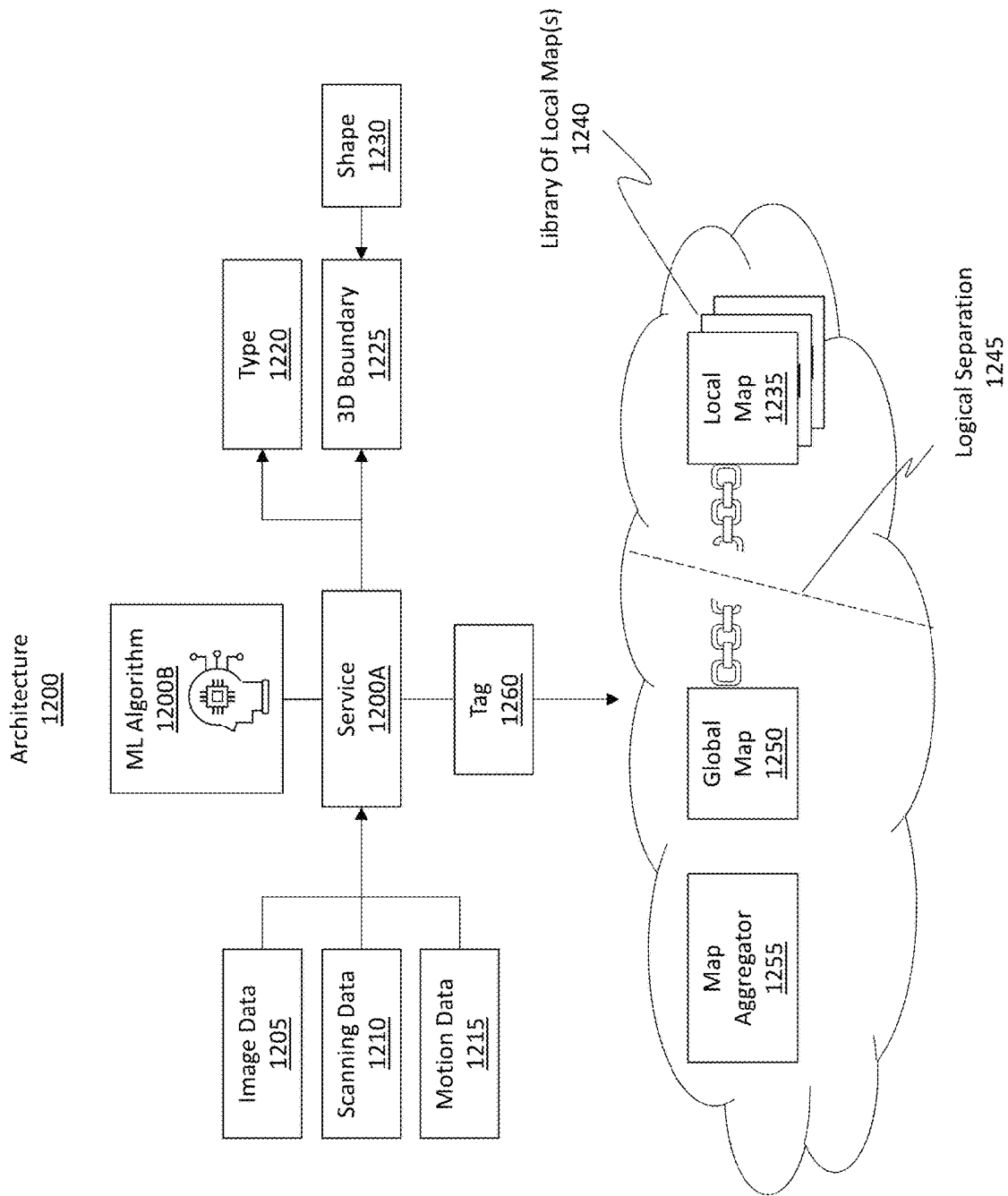
FIG. 12 illustrates an example architecture structured to enable local maps to be de-coupled from a global map.

Attention will now be directed to FIG. 12, which illustrates an example architecture 1200 that can be used to obtain the benefits, advantages, and practical applications described herein. Architecture 1200 is shown as including a computing service 1200A. The service 1200A can be a local service operating on an MR device. Alternatively, the service 1200A can be a cloud service operating in the cloud. In some instances, the service 1200A can be a hybrid of both a cloud and a local service.

Service 1200A is shown as including a machine learning (ML) algorithm 1200B. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Service 1200A is able to receive various different types of input data, such as image data 1205, scanning data 1210, or motion data 1215. The image data 1205 can include images generated by an MR system. The scanning data 1210 can also include image data and/or can include surface reconstruction mesh data, such as depth data and other surface data. The motion data 1215 can include motion data generated by an IMU of the MR system.

The received inputs enable the service 1200A to determine a type 1220 for a platform on which the MR system is operating. For instance, with reference to FIG. 11, the service 1200A can receive the various different inputs and determine that the platform 1100 is of an "elevator-like" type. With reference to FIG. 4, the service 1200A can determine that the platform is a "vehicle-like" type. With reference to FIG. 5, the service 1200A can determine that the platform is a "train-like" type. A skilled person will appreciate how any number of different types can be determined by the service 1200A. Some non-limiting examples of types include, but certainly are not limited to, plane-like types, sea vessel-like types, vehicle-like types, rail-like types, elevator-like types, and so on without limit. Other examples include a slow and smooth "type" of platform or a fast and abrupt type of platform.

In some cases, the embodiments do not trigger the determination of the type for the platform until the embodiments determine that the platform is moving. Other embodiments, however, can preemptively predict that the MR system is in a platform that will shortly move or is capable of moving and thus the resulting local map should be de-linked from a global map.

Having identified the type for the platform, the service 1200A can then generate a three-dimensional boundary 1225 or object that is designed to encompass, surround, or envelope the platform, similar to how a geofence works. Optionally, the ML algorithm 1200B can be used to generate the shape 1230 for the 3D boundary 1225. Generally, the shape 1230 is selected or designed to approximate the shape of the actual platform. In some cases, the shape 1230 is designed to closely approximate the shape of the platform while in other cases simplified shapes can be used. An example will be helpful.

Suppose the platform was that of a car. In a detailed example, the service 1200A can attempt to identify the specific make and model of the car. This identification process can be based on at least an initial set of scanning data obtained while the MR system was inside of the car or perhaps while the MR system was approaching the car (and a prediction was made that the MR system will shortly be entering the car). Using that data, the service 1200A can attempt to identify key features that would enable the service 1200A to specifically identify the exact make and model of the car. Having that information, the service 1200A can then generate a shape for the 3D boundary 1225, where that shape very closely or perhaps exactly follows the characteristics of the car's make and model.

In a simplified example, the service 1200A can select a simplified shape to approximate that of the car type. For instance, the service 1200A might select a cylinder as the shape of the 3D boundary 1225. In some cases, the service 1200A might select a rectangular prism as the shape of the 3D boundary 1225. Any shape can optionally be chosen, including symmetrical shapes, asymmetrical shapes, or even any kind of abnormal shapes.

Regardless of the chosen shape, the 3D boundary 1225 is designed to establish the bounds or confines for a new map that will be generated for the platform. This "new" map can be referred to as a "local" map. The local map 1235 is representative. Optionally, the service 1200A might generate a library of local map(s) 1240 that might include a plurality of local maps for the platform. Notably, the local map 1235 is de-coupled, de-linked, or otherwise logically separated (e.g., as shown by logical separation 1245) from a global map 1250 that might exist for other parts of the real world. A map aggregator 1255, which can optionally exist in the cloud, is instructed that the local map 1235 is to be logically separated from the global map 1250.

Various techniques can be used to logically separate the local map 1235 from the global map 1250. In one scenario, the MR system relies on the 3D boundary 1225 to distinguish scanning data that is internal to the platform from scanning data that is external to the platform. The MR system can optionally tag that data, as shown by tag 1260. The tags can then be used to filter the data.

In another embodiment, the MR system uploads its scanning data and the map aggregator 1255 can determine what scanning data belongs to the local map 1235 and what scanning data belongs to the global map 1250. Such a determination can also optionally be made based on the tags. Regardless, a local map is generated for the platform, and this local map is logically separated from a global map. FIGS. 13, 14, 15, 16, 17, 18, and 19 provide various different examples.

Figure 13:
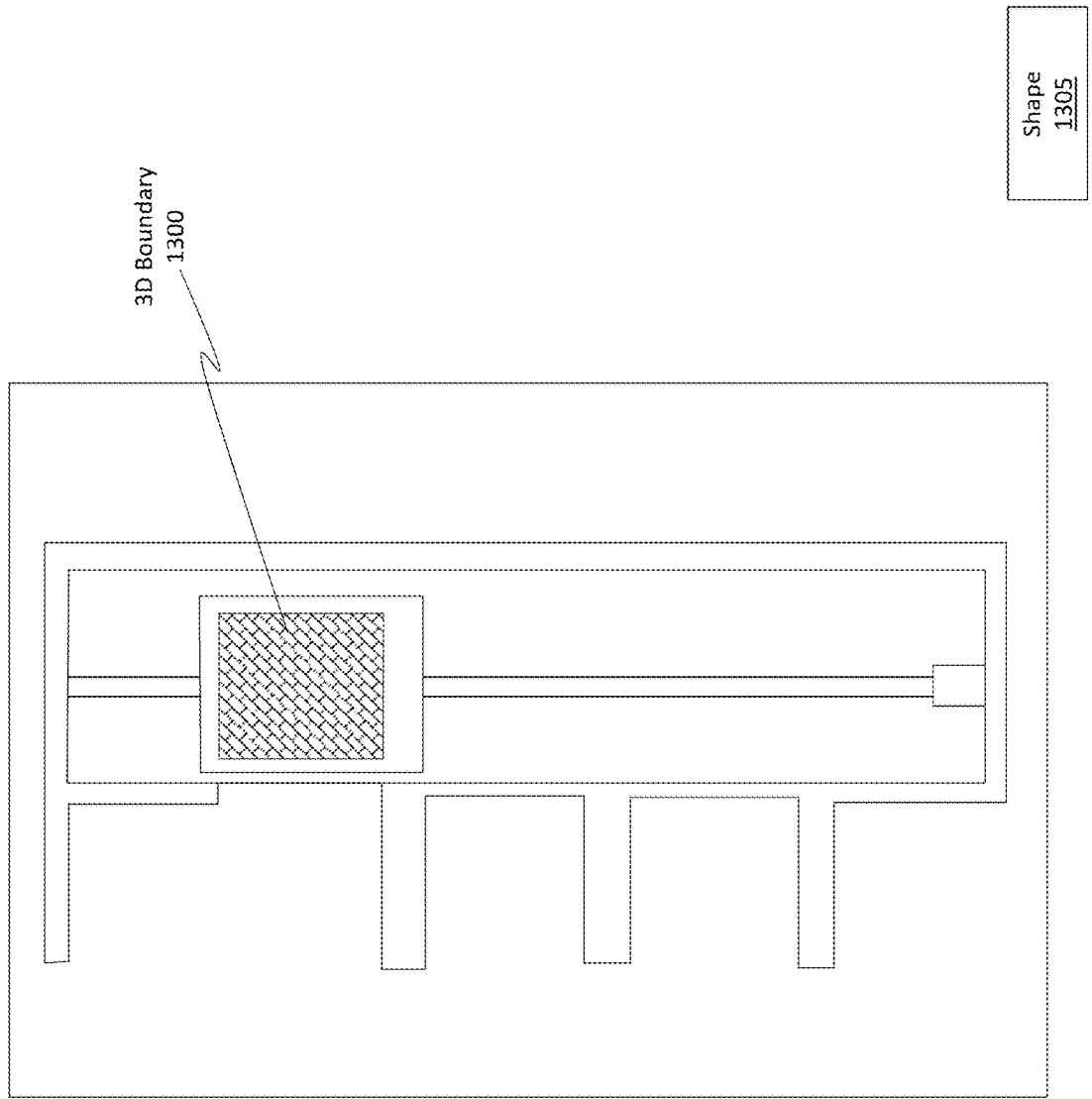
FIG. 13 illustrates a 3D boundary.

FIG. 13 shows how the embodiments are able to generate a 3D boundary 1300 for a platform that is currently moving or that has the ability to be readily moveable. For instance, in FIG. 13, the 3D boundary 1300 has been generated for the elevator. In this scenario, the shape 1305 of the 3D boundary 1300 has been selected to approximate the shape of the elevator. As an example, the shape 1305 can be that of a rectangular prism. The 3D boundary 1300 operates to distinguish what scanning data should be associated with the platform and what scanning data should be discarded or at least not associated with the platform.

Figure 14:
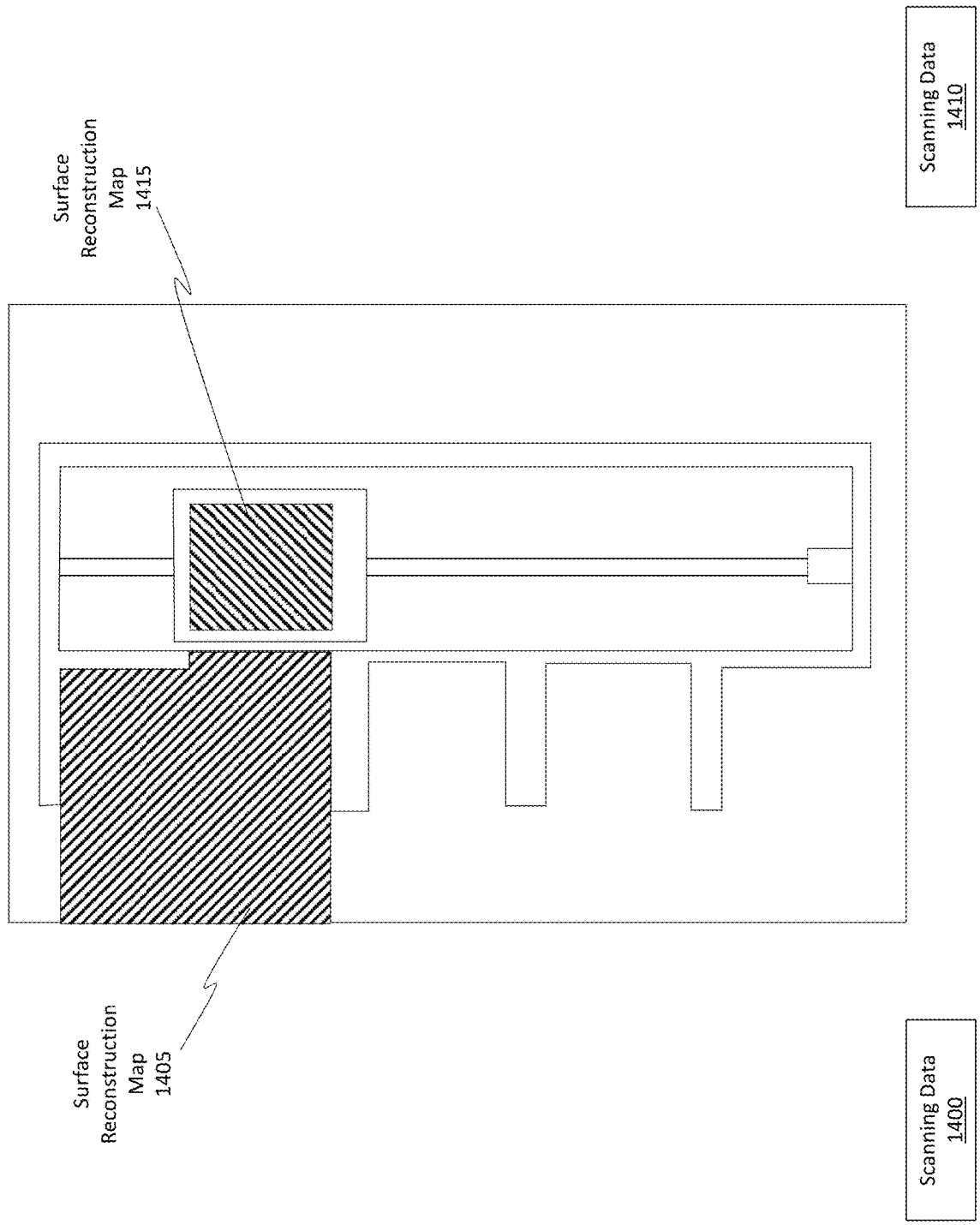
FIG. 14 illustrates different maps.

FIG. 14 shows a scenario where scanning data 1400 is generated and is used to build or supplement the surface reconstruction map 1405, which is representative of the global map. In contrast, scanning data 1410 is isolated from the scanning data 1400 and is used to build or supplement the surface reconstruction map 1415, which is representative of the local map. The scanning data 1410 was limited based on the 3D boundary 1300 of FIG. 13.

Figure 15:
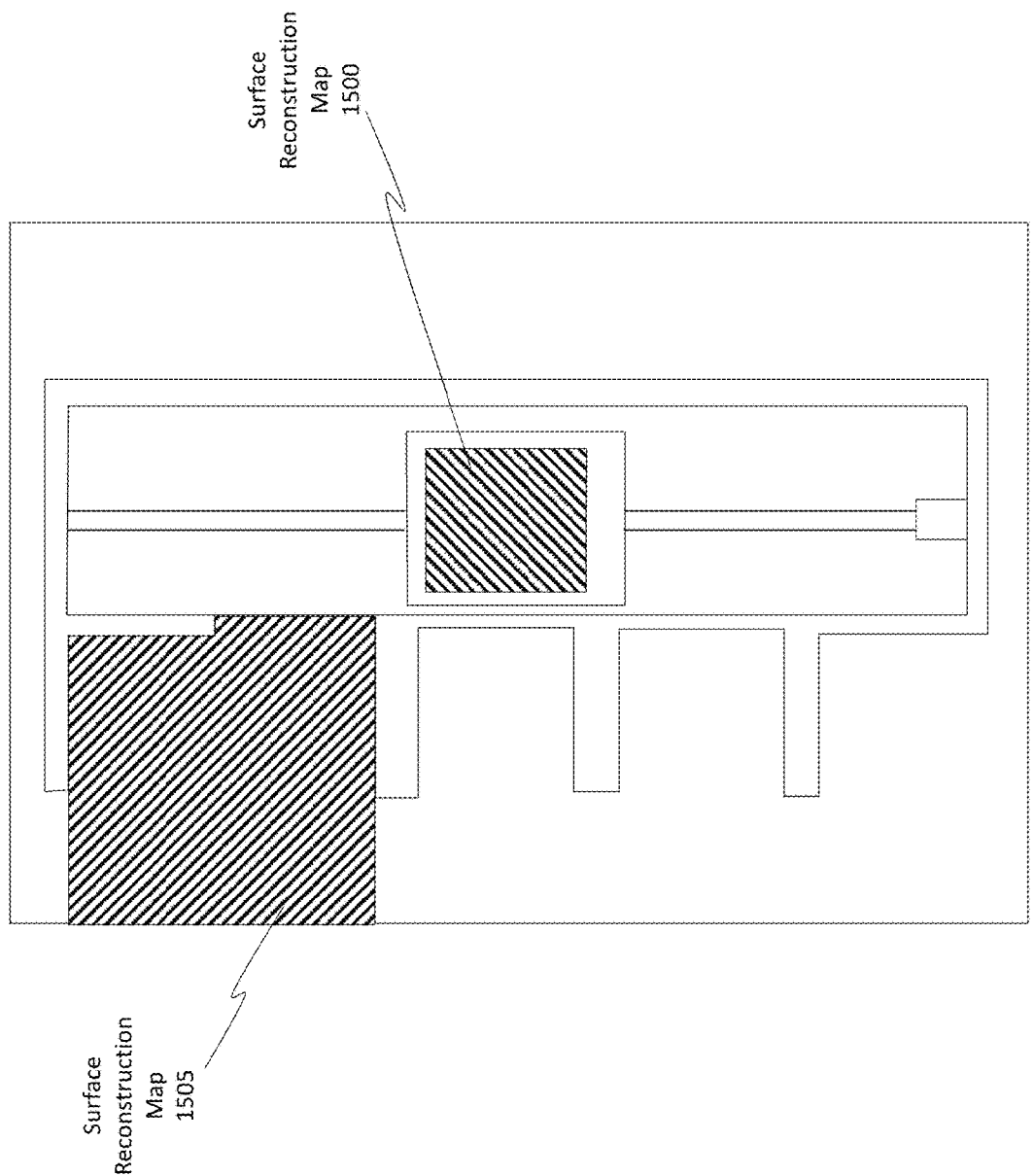
FIG. 15 illustrates how a local map can remain independent of a global map.

FIG. 15 shows how the surface reconstruction map 1500 (i.e. the local map) exists independently of the surface reconstruction map 1505 (i.e. the global map).

Figure 16:
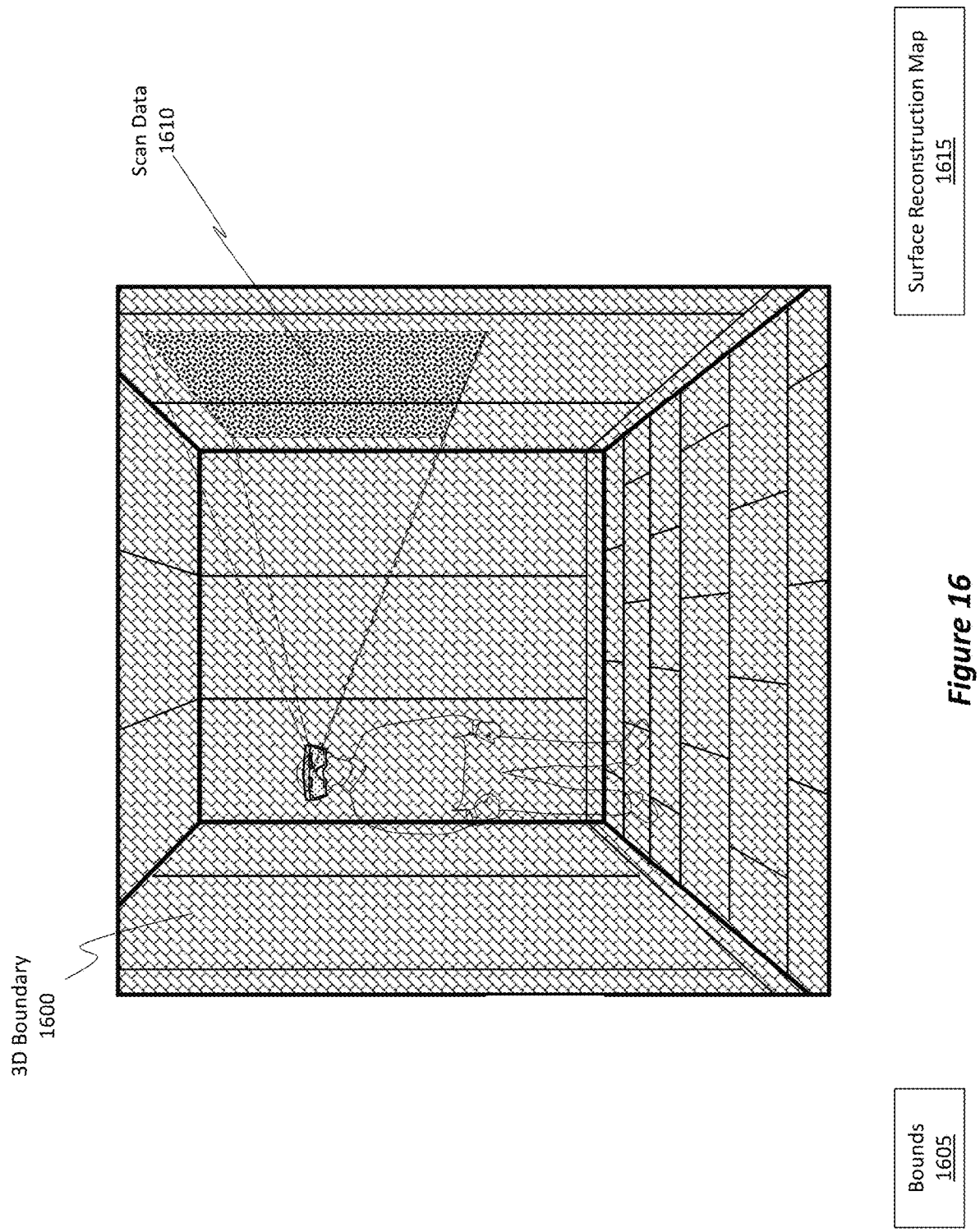
FIG. 16 illustrates another example of a 3D boundary.
Figure 17:
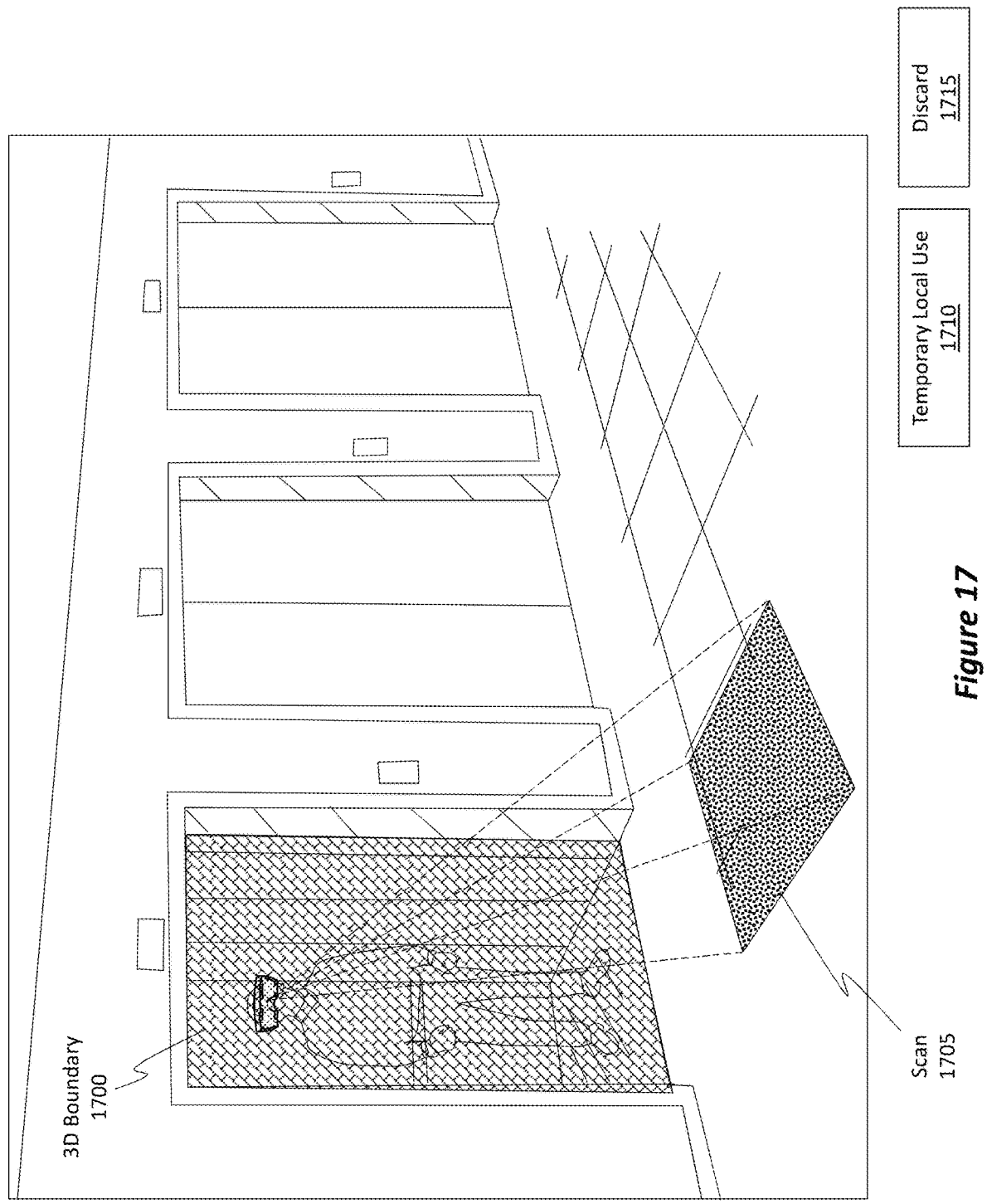
FIGS. 17, 18, and 19 illustrate various different scenarios where an HMD is performing scanning operations.
Figure 18:
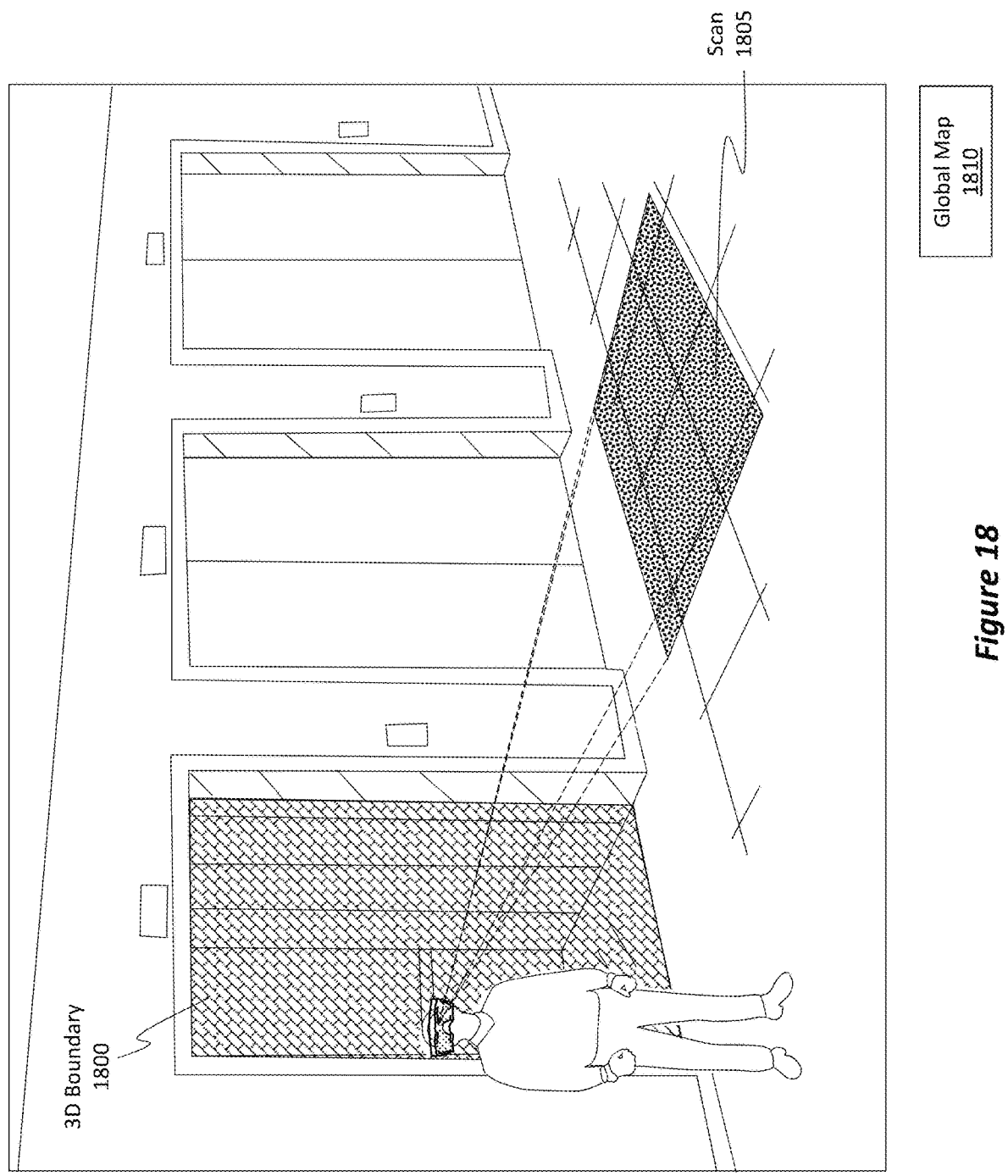
Figure 19:
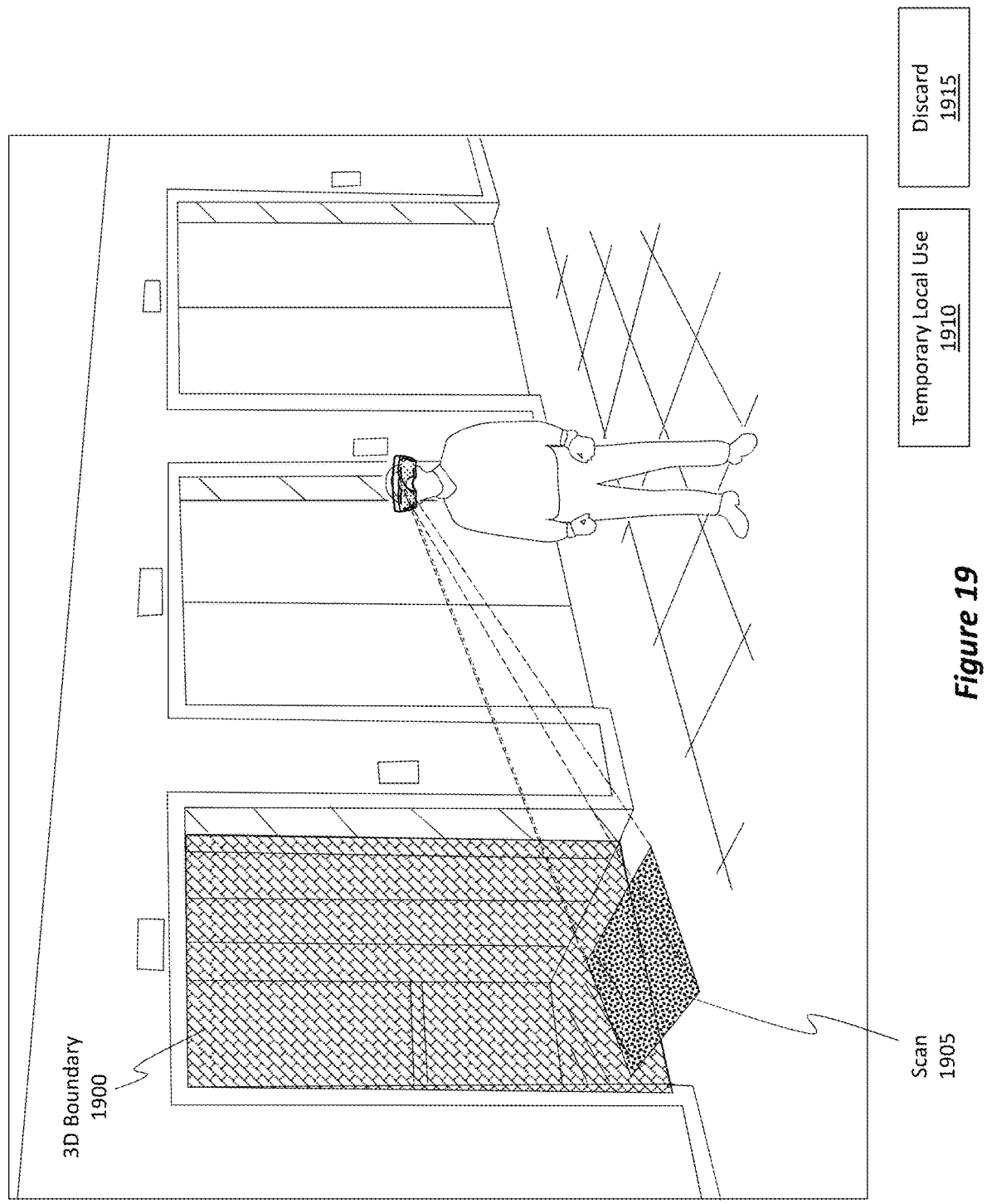

FIG. 16 shows the existence of the 3D boundary 1600 relative to the elevator platform. Notice, the bounds 1605, size, or shape of the 3D boundary 1600 generally approximates that of the platform. FIG. 16 also shows how an HMD is generating scan data 1610 while the HMD is operating in the platform. The scan data 1610 is being used to build or supplement a surface reconstruction map 1615 for the platform. Notably, the scan data that is used to contribute to the surface reconstruction map 1615 is limited based on the 3D boundary. If scan data is obtained for content that is external to the 3D boundary 1600, that scan data will be prevented from being used to build or supplement the surface reconstruction map 1615. FIGS. 17, 18, and 19 provide some useful examples.

FIG. 17 shows a scenario where the HMD is located on the platform and where a 3D boundary 1700 has been generated. In this example scenario, the HMD is performing a scan 1705 of content that exists external to the 3D boundary 1700 while the MR system is inside of the 3D boundary 1700, as shown by the scan 1705 of the floor outside of the elevator. Because the scan data is for content that is external to the 3D boundary 1700, that scan data will be prevented from being used to build or supplement the surface reconstruction map for the elevator (e.g., the surface reconstruction map 1500 from FIG. 15).

Optionally, that scan data can be used in a temporary manner to enable the HMD/MR system to localize itself relative to an environment, as shown by temporary local use 1710. Notably, however, that scan data will eventually be discarded, as shown by discard 1715 and will be prevented from being used to build or supplement the map for the elevator.

FIG. 18 shows a scenario where the MR system has exited the platform. The 3D boundary 1800 still exists for the platform. FIG. 18 shows a scenario where the HMD is performing a scan 1805 of content external to the platform while the HMD is also located external to the platform and the 3D boundary 1800. The resulting scan data will be prevented from being included in the local map for the elevator platform, but that scan data will be included in the global map 1810.

FIG. 19 shows a scenario involving the 3D boundary 1900 for the elevator platform. Again, the MR system is performing a scan 1905 while the HMD is located externally relative to the 3D boundary 1900. In this case, at least a portion of the scan 1905 is intersecting the 3D boundary 1900. In this example case, the embodiments can optionally use the scan data, which is of content inside of the 3D boundary 1900, in a temporary manner, as shown by temporary local use 1910 (e.g., perhaps for localization purposes) but the MR system will eventually discard 1915 that data and prevent it from being included in the global map as well as the local map.

Thus, the determination as to when to discard data is primarily based on the position of the MR system relative to the established 3D boundary as well as the content that is being scanned. If the MR system is located internally relative to the 3D boundary and if the scan data is for content that is also located in the 3D boundary, then that scan data will be used to build or supplement the local map for the platform. If the MR system is located internally relative to the 3D boundary but the scan data is for content that is located externally relative to the 3D boundary, then that scan data will likely be prevented from being used to build or supplement the local map (unless, as described later, it is determined that the external content is also on the moving platform). Furthermore, this scan data will be prevented from being used to build or supplement the global map.

On the other hand, if the MR system is located outside of a 3D boundary and if the scan data is for content that is located inside of the 3D boundary, that scan data will be prevented from being used to build or supplement the local map as well as the global map. If the MR system is located outside of the 3D boundary and if the scan data is for content that is also located outside of the 3D boundary, then that scan data will be used to build or supplement the global map but not the local map.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 20:
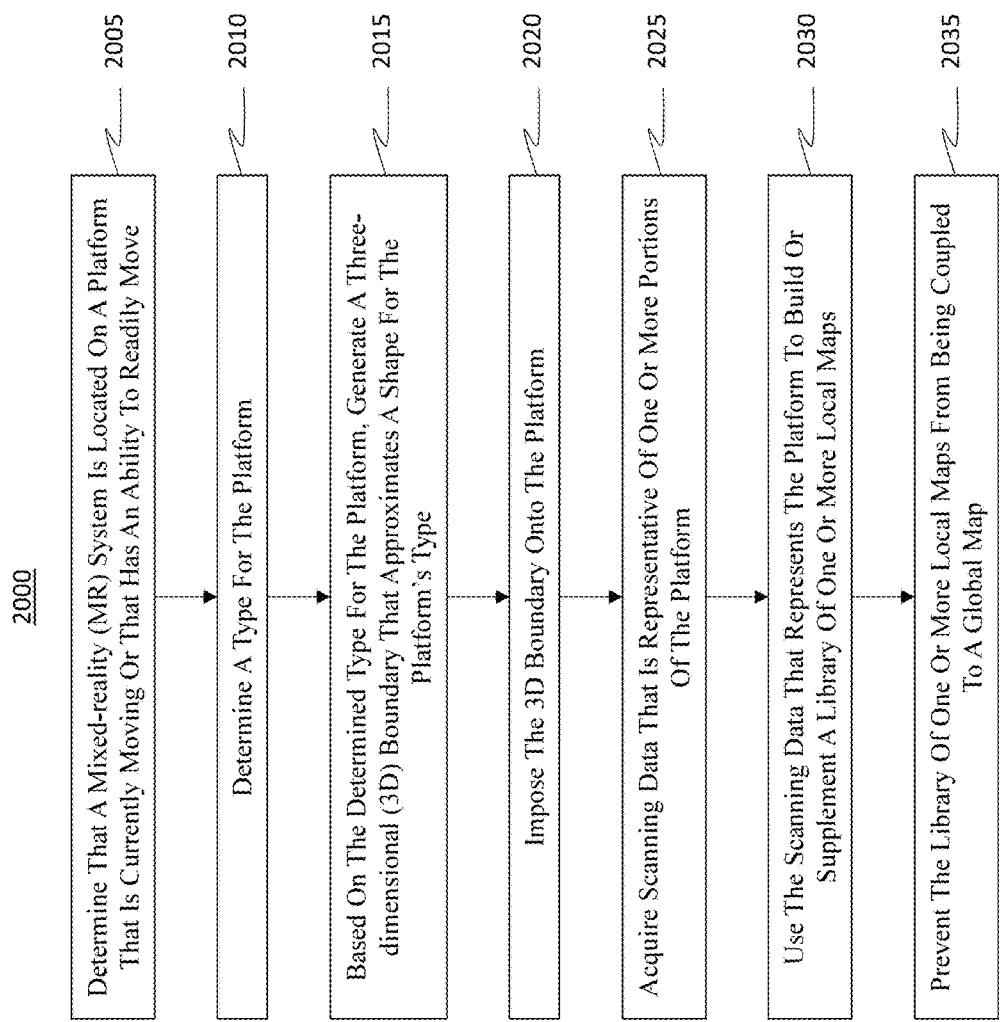

Attention will now be directed to FIG. 20, which illustrates a flowchart of an example method 2000 for enabling a library of one or more local maps to remain de-coupled from a global map. Method 2000 can be implemented using the architecture 1200 of FIG. 12. Optionally, method 2000 can be performed by the service 1200A and/or the ML algorithm 1200B. Recall, the service 1200A can execute locally on an MR system or, alternatively, the service 1200A can execute in a cloud environment. The service can also be a hybrid combination of local and cloud based operations.

Method 2000 includes an act (act 2005) of determining that a mixed-reality (MR) system is located on a platform that is currently moving or that has an ability to readily move. That is, in some cases, the platform might not be currently moving, but the embodiments are able to determine that the platform is of a type capable of being readily moveable. The process of determining that the MR system is located on the platform can optionally be based on one or more of motion data or image data. In some cases, the embodiments can predict that the MR system is about to enter a platform that is capable of moving. This prediction can be performed by analyzing image data that is obtained while the MR system approaches what appears to be a platform capable of movement.

Figure 21:
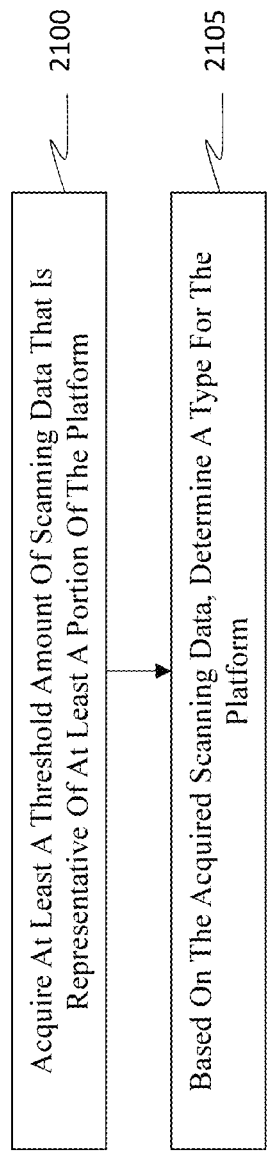

Various different operations can then be performed in an attempt to determine the platform's type, as shown by act 2010. For instance, FIG. 21 shows an act (act 2100) that includes acquiring at least a threshold amount of scanning data that is representative of at least a portion of the platform. Based on the acquired scanning data, act 2105 includes determining a type for the platform. In this scenario, the scanning data can be used to determine the platform's type. For instance, the scanning data can include image data and/or surface reconstruction data. The embodiments are able to perform image analysis and/or other types of analysis to determine what the platform is. The example related to determining the car's make and model is representative of these operations.

In another scenario, as shown in FIG. 22, an act (act 2205) can be performed where this act involves using motion data associated with the platform to determine the type for the platform. For instance, IMU data (i.e. motion data) can be collected. In some cases, this motion data might be convoluted motion data that includes a first signal (e.g., the motion of the MR system) riding on top of a second signal (e.g., the motion of the platform). The embodiments can optionally rely on a trained ML algorithm that has been trained using convoluted motion data. The ML algorithm can optionally identify the type of platform based on its analysis of the convoluted motion data. Accordingly, in some implementations, the process of determining the type for the platform can be based on one or more of scanning data, motion data, or image data. Optionally, visual tracking data can be used to determine the type of platform. For instance, the process of determining the type of platform can be performed when the user and platform motion are de-convolved, which can be performed by subtracting the relative motion of the user-to-platform (obtained from visual tracking data) from the IMU data to obtain the de-convolved platform IMU signal.

In any event, the embodiments are able to determine the type for the platform, as shown in act 2010 of FIG. 20. Based on the determined type for the platform, act 2015 includes generating a three-dimensional (3D) boundary that approximates a shape for the platform's type. The embodiments generate the 3D boundary based on the determination that the type for the platform is of a type that can move. The embodiments will refrain from performing the disclosed operations for stationary platform types (i.e. platforms that are not capable of readily being moved, such as buildings, sidewalks, etc.).

In some implementations, the shape of the 3D boundary is a simple shape comprising at least one of: a rectangular prism, a triangular prism, a cylinder, a cone, or a sphere. Abnormal or asymmetric shapes can also be used. In some cases, the shape is selected to closely approximate (e.g., based on a defined approximation threshold) an actual real-world shape of the platform, such as a custom platform specific shape. That real-world shape can be determined via investigative processes to determine the physical characteristics/dimensions of the platform.

Act 2020 then includes imposing the 3D boundary onto the platform. The 3D boundary can be analogized to a geofence. The 3D boundary helps differentiate what scanning data is to be used to build or supplement a local map for the platform.

Act 2025 includes acquiring scanning data that is representative of one or more portions of the platform. Notably, the bounds of all scanning data that represents the platform is at least initially limited to that of the 3D boundary. The scanning data, which is representative of the platform, can be generated by the MR system.

Act 2030 includes using the scanning data that represents the platform to build or supplement a library of one or more local maps. The library of one or more local maps is representative of the platform.

Act 2035 includes preventing the library of one or more local maps from being coupled to a global map. In this manner, the library is allowed to remain independent of the global map.

Despite the platform moving to a new location, the library for that platform can be accessed and then used while an MR system is on the platform or while an MR system is approaching the platform (and a determination is made that the MR system will likely enter the platform). Any number of MR systems can access that local map, and any number of MR systems can contribute to the build up of that map.

In some cases, the library of one or more local maps can be merged with a second library of one or more maps, where the second library is also representative of the platform. For instance, a second MR system may also have triggered the build of a local map for the same platform. Optionally, these local maps can be merged with one another while not being merged with the global map. In some cases, the same MR system generated multiple different local maps for the same platform.

For instance, consider the following scenario. Suppose an MR system is operating on a train car. The MR system scans one train car. The train then stops. The MR system then moves to a different train car and begins to scan that train car while it is moving or perhaps while it is stationary (but the MR system recognizes it is capable of ready movement). Here, these two train cars are part of the same train. The MR system can optionally perform various localization operations and/or image analysis operations to determine that the two local maps are actually for the same platform. In this case, the MR system can then merge the local maps, which were generated by the same MR system. Further details on these aspects will be provided shortly.

In some implementations, method 2000 can include additional acts. For instance, the method can include an act of determining that the MR system has left the platform in response to a determination that the MR system has left a confines of the 3D boundary. Determining that the MR system left the confines of the 3D boundary can be based on location data (e.g., GPS coordinates), scanning data, image data, or perhaps even motion data.

Subsequent to determining that the MR system has left the platform, the embodiments can re-evaluate whether the MR system is actually still on the platform. This re-evaluation can be performed in response to a determination that the MR system is still moving with a movement of the platform. The embodiments can then expand the size of the 3D boundary based on a determination that the MR system has actually not left the platform. Further details on this aspect will be provided shortly.

In another scenario, after determining that the MR system has left the platform, the embodiments can acquire new scanning data for the surrounding environment. The embodiments may then prevent the new scanning data from being included in the library of one or more local maps but can optionally include it in the global map.

In some cases, the embodiments acquire additional scanning data while the MR system is located inside the 3D boundary. At least a portion of the additional scanning data represents content that is not a part of the platform. In this scenario, the embodiments can optionally append a tag onto that portion of the additional scanning data. The tag can indicate that the portion of additional scanning data is not representative of the platform and was generated by the MR system while the MR system was within a confines of the 3D boundary. Optionally, the tagged scanning data can be discarded.

Optionally, it can be uploaded to a map merger or map aggregator, and the map merger can determine how to use the tagged data. That is, the embodiments can upload the tagged scanning data to a map merger or map aggregator. In another scenario, the embodiments can prevent the tagged scanning data from being uploaded to the map aggregator. In one embodiment, the tagged scanning data can be temporarily used for localization purposes but is prevented from being persistently included in the library of one or more local maps.

In some implementations, the embodiments can determine that the MR system is located externally relative to the 3D boundary. The embodiments also cause the MR system to obtain new scanning data. At least a portion of the new scanning data represents at least a portion of the platform, as bounded by the 3D boundary. The embodiments temporarily use the portion of the new scanning data for localization purposes while preventing that portion of the new scanning data from being included in the global map as well as from being included in the local map.

Optionally, the embodiments can acquire new scanning data, where at least a portion of the new scanning data represents an object that is outside of the 3D boundary. The embodiments can then determine that the object is moving with the MR system and with the platform.

In such a scenario, the embodiments can then expand the size of the 3D boundary to include the object. FIGS. 23, 24, 25, 26, 27, and 28 are illustrative of the option to expand the size of the 3D boundary.

Modifying the Size of the 3D Boundary

Figure 23:
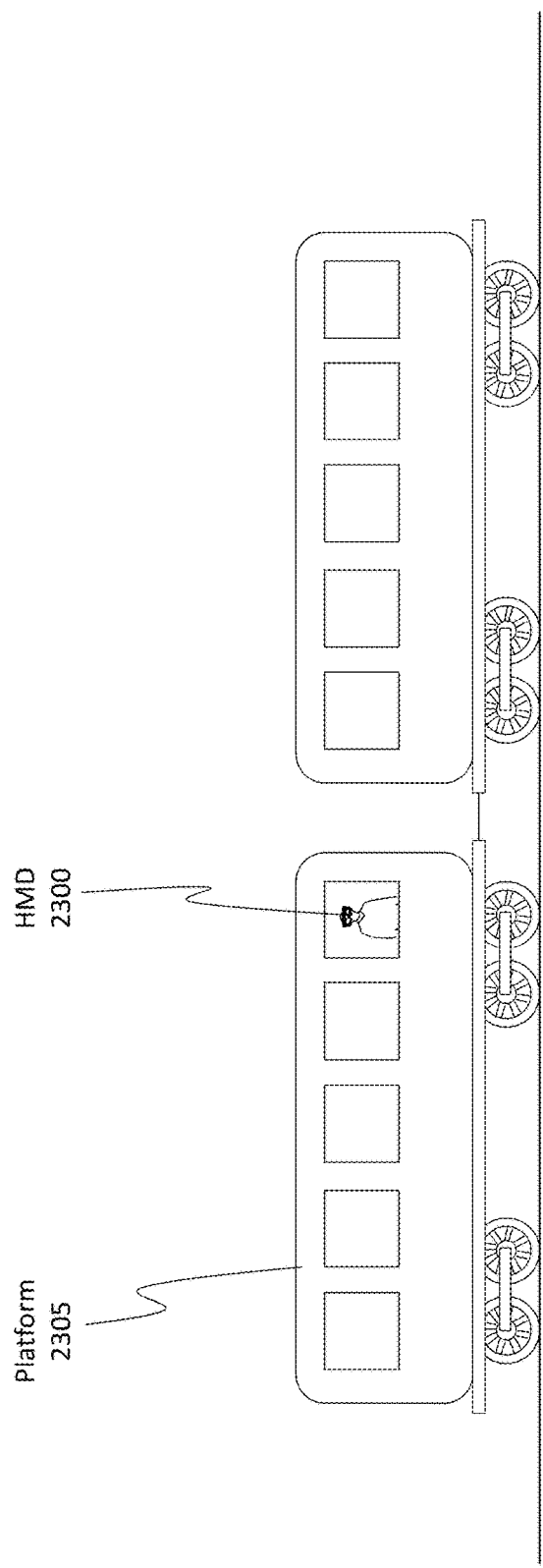
FIGS. 23, 24, 25, 26, 27, and 28 illustrate various techniques for dynamically modifying the size of a 3D boundary.
Figure 24:
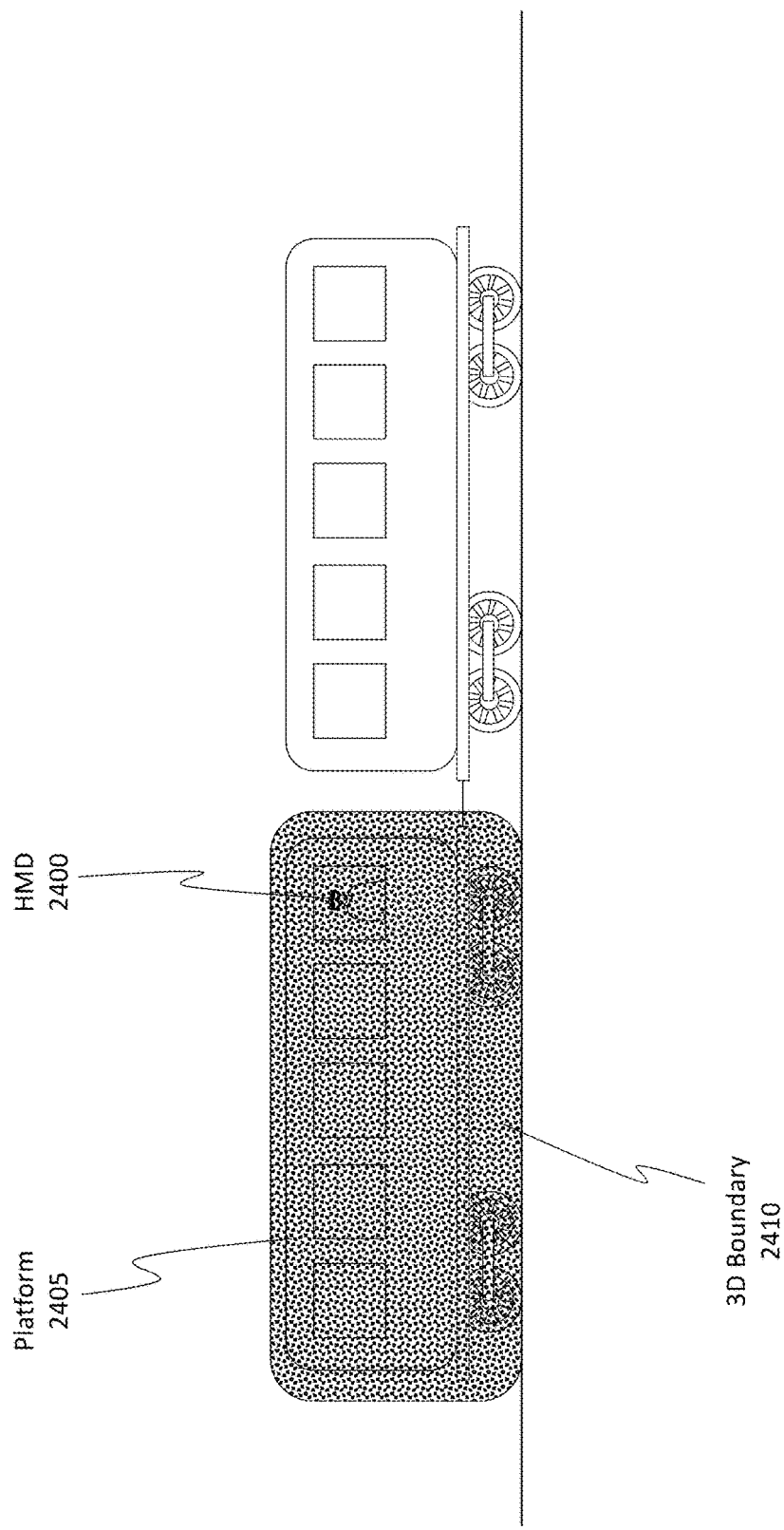

FIG. 23 shows a scenario where an HMD 2300 is currently located on a platform 2305, which is either moving or is capable of readily moving. In response to this determination, the embodiments generate a 3D boundary for the platform, as shown in FIG. 24. Notably, FIG. 24 shows the HMD 2400 and the platform 2405 as well as a new 3D boundary 2410. The 3D boundary 2410 operates to limit what scanning data will be used to build or supplement the local map for the platform 2405.

Figure 25:
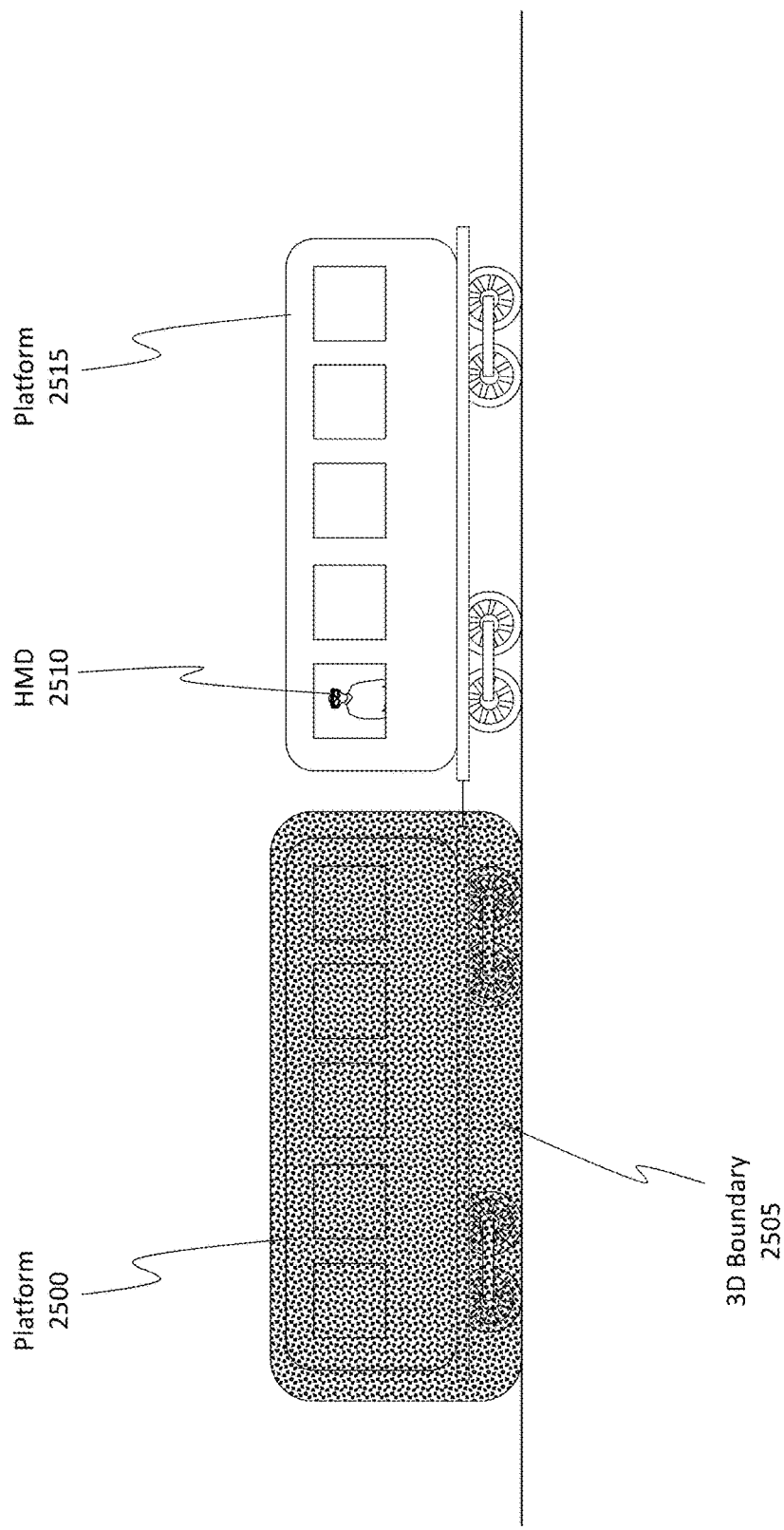

FIG. 25 shows a new scenario. FIG. 25 shows the previous platform 2500 and the 3D boundary 2505. Now, however, the HMD 2510 is located on a new platform 2515. Notably, the platform 2515 is actually coupled to or perhaps is the same as the platform 2500, but the platform 2515 was not included in the 3D boundary 2505. There are various reasons as to why the platform 2515 may not have been included in the 3D boundary 2505. As one example, the HMD 2510 may have moved from the platform 2500 to the platform 2515 while the train was stopped. The train may later begin to move. Some embodiments are configured to generate the 3D boundary when the platform is moving. Because the platform 2515 was not moving when the HMD 2510 entered it, there was no 3D boundary created at that time, and the 3D boundary 2505 was not large enough to include the platform 2515. Some embodiments generate the 3D boundary even if the platform is not currently moving.

In any event, a determination is made that the platform 2515 should be included in the 3D boundary 2505 because the platform 2515 is the same platform as platform 2500 or perhaps is an extension of the platform 2500.

Figure 26:
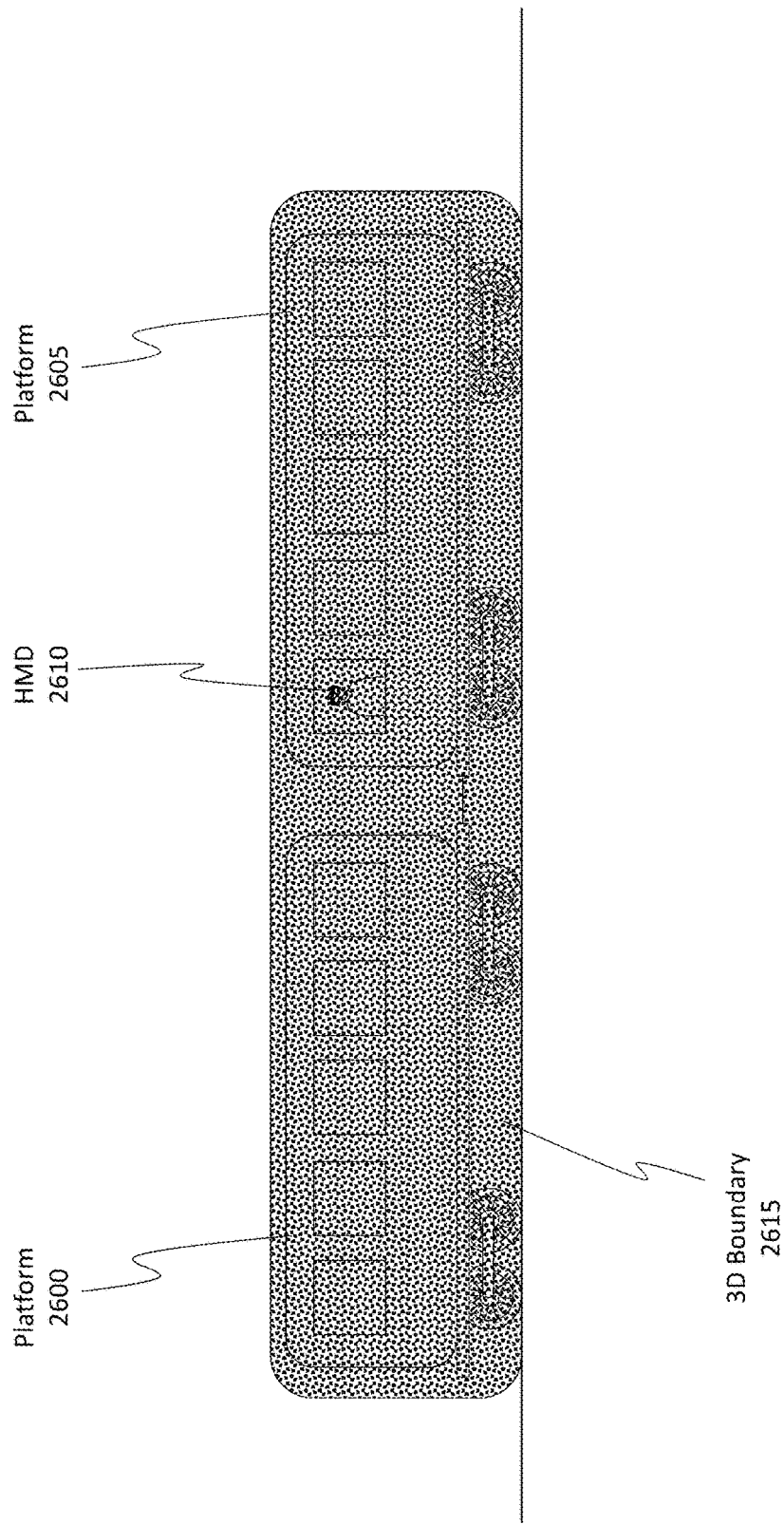

FIG. 26 shows a scenario comprising the platform 2600, the platform 2605, and the HMD 2610. Now, the 3D boundary 2615 has been sufficiently expanded in size so as to include the platform 2605 as well as the platform 2600.

Figure 27:
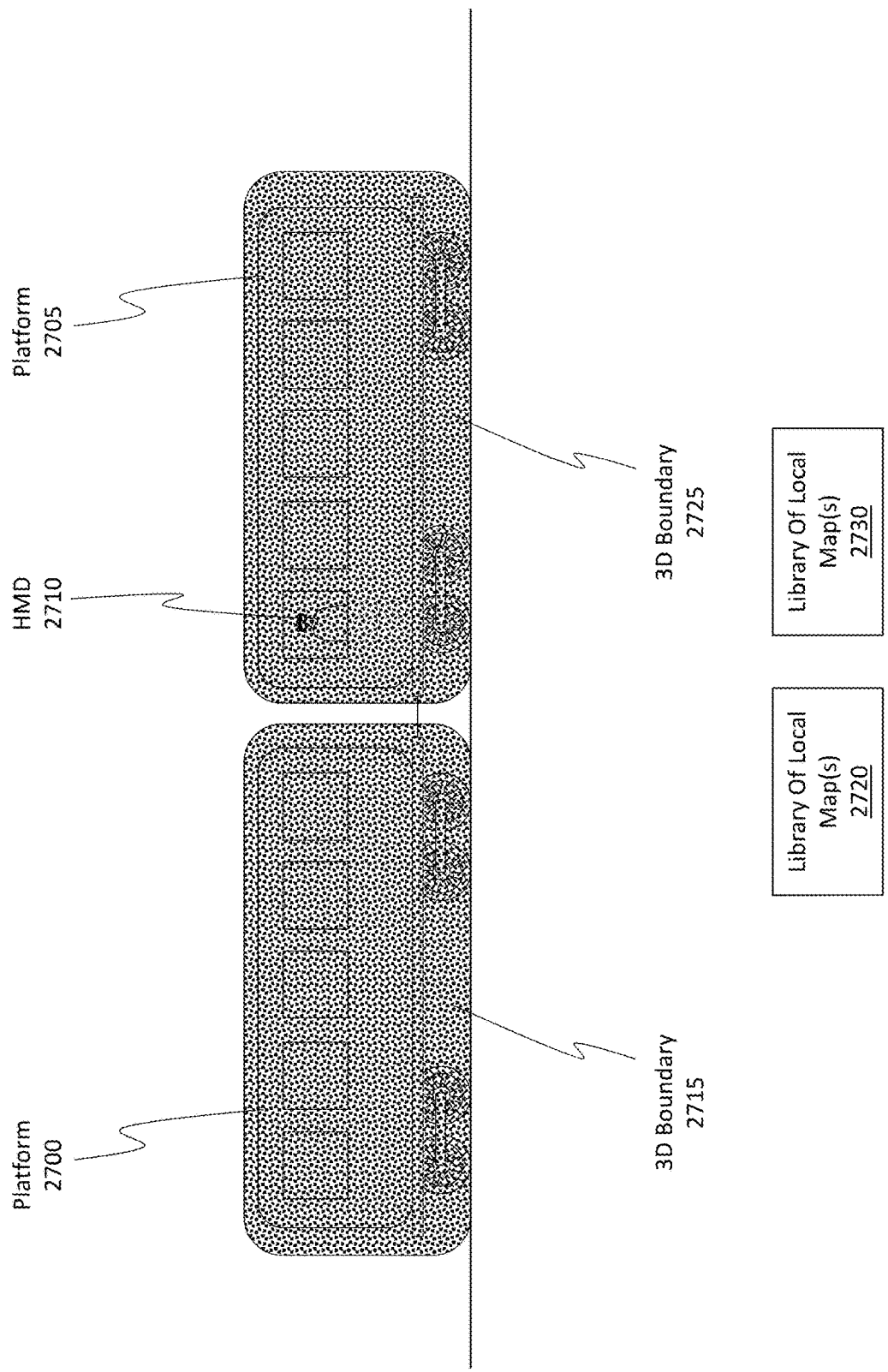

In some cases, the HMD may be located on a different part of the same platform, and a new local map may be generated for that platform. FIG. 27 is illustrative.

FIG. 27 shows a platform 2700, a platform 2705, and an HMD 2710. At one point in time, the HMD 2710 may have been located on the platform 2700 and triggered the generation of the 3D boundary 2715 along with an accompanying library of local map(s) 2720 for the platform 2700. Alternatively, other MR systems may have generated the library of local map(s) 2720.

In any event, the HMD 2710 is now located on the platform 2705. The HMD 2710 has triggered the generation of the 3D boundary 2725 along with the library of local map(s) 2730 for the platform 2705. Notice, in this current scenario, the library of local map(s) 2720 and the library of local map(s) 2730 are independent relative to one another, and the 3D boundaries are distinct. Those local maps are also distinct relative to a global map. In this particular scenario, however, it is advantageous to combine these local maps because they reflect the same platform.

Figure 28:
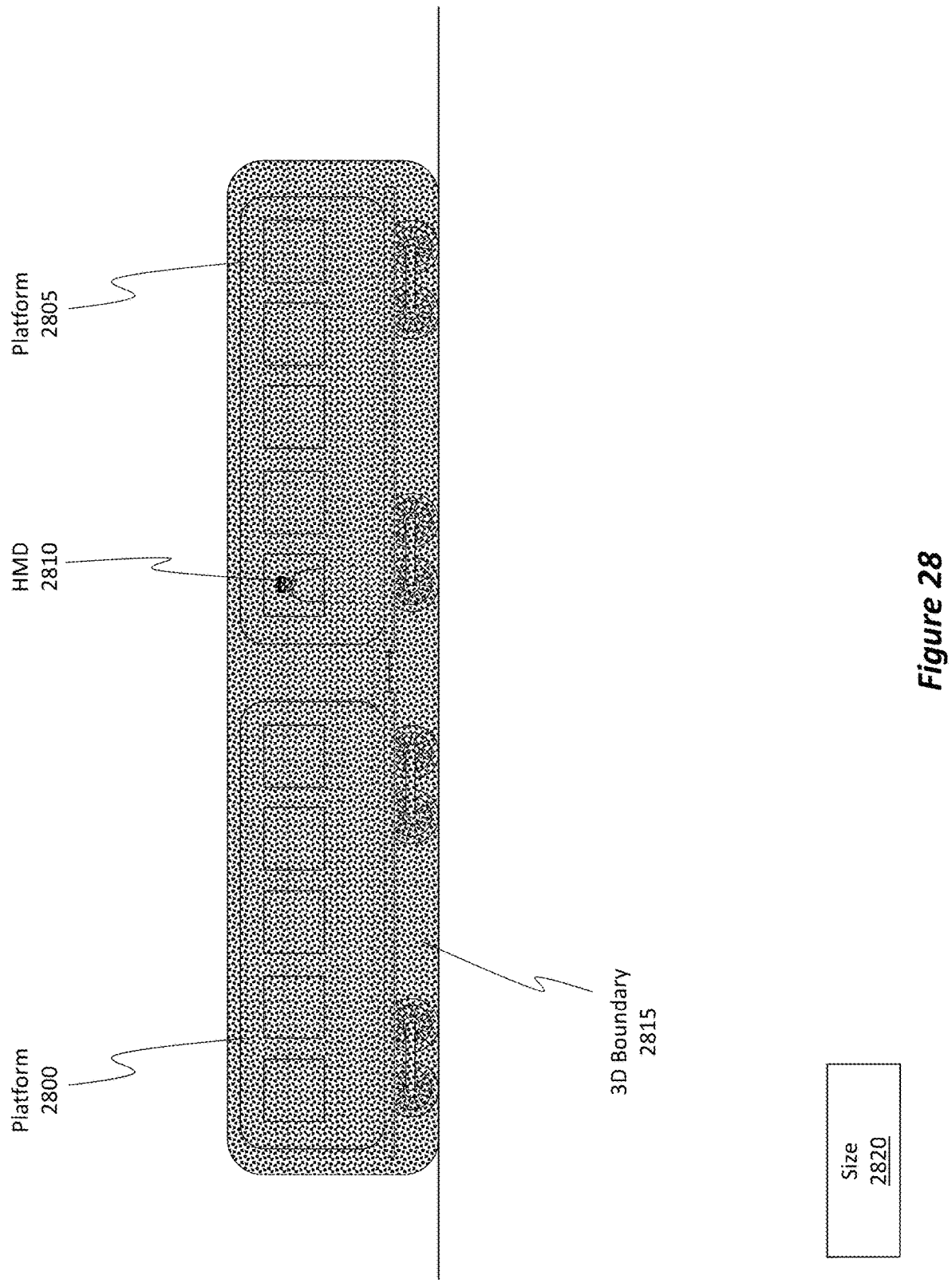

FIG. 28 shows the platform 2800, the platform 2805, and the HMD 2810. In this scenario, the embodiments recognized that the platforms 2800 and 2805 are connected to one another (e.g., perhaps that determination is based on motion data of the platform). The embodiments then combined the library of local map(s) and combined the 3D boundaries, as shown by a merged version of the 3D boundary 2815. In this scenario, therefore, the embodiments dynamically modified a size 2820 of the 3D boundary to be larger because the embodiments determined that the multiple different maps can be fused together. Notably, these local maps are still kept separate from the global map. The library of one or more local maps can optionally be made accessible to any number of different MR systems based on a localization determination. For instance, by acquiring and analyzing image data, an MR system can determine it is on the platform. The MR system can then query to determine whether a local map exists for that platform. If so, then the MR system can be provided access to that local map.

Accordingly, the embodiments improve how maps are generated for different environments and platforms. By providing a more robust map, the embodiments can improve the image quality of displayed content.

Additional Scenarios

A majority of this disclosure focused on determining if the device is on a moving platform and then instantiating 3D bounding boxes. In some scenarios, however, the embodiments can individually label various 3D points. By way of further clarification, the 3D points that form the tracking and relocalization maps can individually be labeled as "tracked-while-on-moving-platform".

If a point is successfully tracked while the system is on a moving platform, then that point can be viewed as having a high likelihood that it is part of the moving platform map, independently of bounding boxes. Thus, the embodiments are able to determine which parts of the map are included in the moving platform map. The fact that the tracked point is tracked with the platform can be viewed as being direct evidence contrary to the indirect inference based on the bounding box shape.

Thus, in one scenario, a 3D bounding box can be used to determine which points belong to a moving platform. In another scenario, the embodiments are able to determine whether a tracked point is moving with the platform. Such an operation can optionally be performed using image data. For instance, multiple images of the point can be obtained over time. If the point is identified as moving with the platform, then the embodiments can determine that the point is likely a part of the platform and can thus include that point in the platform's map.

Both of these techniques can be used jointly or independently relative to one another. This second technique is fully generic on its own, however, and this second technique does not need to "recognize" the type of platform. There are a few potential degenerate situations where the above statement is not strictly the case, but those situations are often of low importance. For instance, when driving straight in a vehicle, some points that are very far away might appear to move with the moving platform. It is often the case that very far points (i.e. points that are located beyond a threshold distance) are discarded for other mapping accuracy reasons. Thus, these "degenerate" situations are often resolved as a result of performing other mapping operations.

Example Computer/Computer Systems

Figure 29:
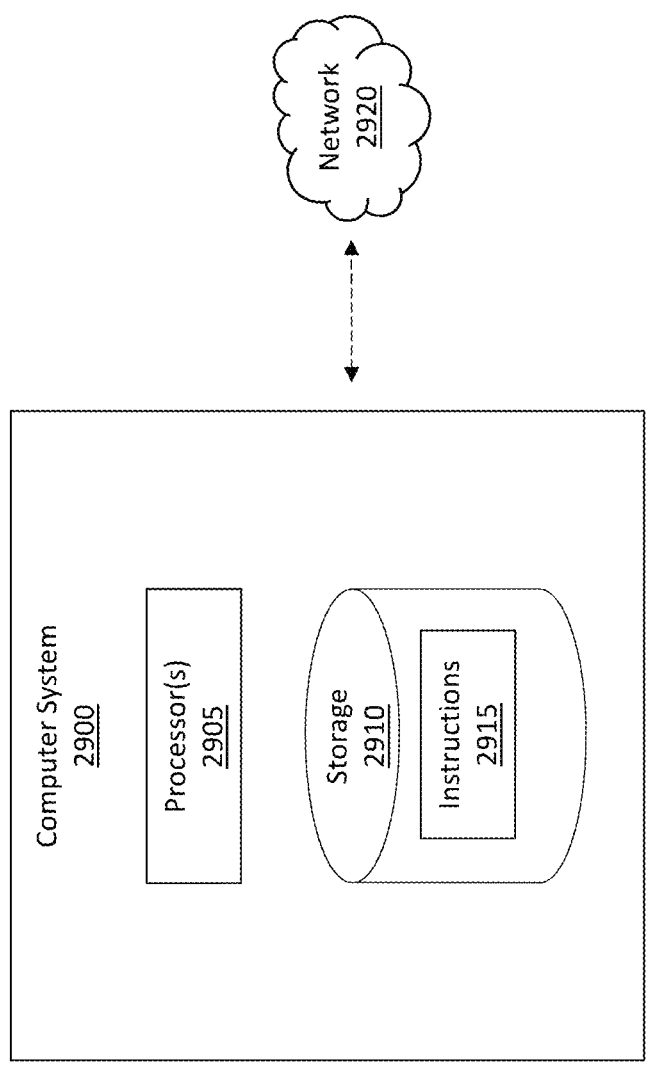
FIG. 29 illustrates an example computer system that can be configured to perform any of the disclosed operations.

Attention will now be directed to FIG. 29 which illustrates an example computer system 2900 that may include and/or be used to perform any of the operations described herein. Computer system can be representative of or can include the service 1200A from FIG. 12. Computer system 2900 may take various different forms. For example, computer system 2900 may be embodied as a tablet, a desktop, a laptop, a mobile device, or a standalone device, such as those described throughout this disclosure. Computer system 2900 may also be a distributed system that includes one or more connected computing components/devices that are in communication with computer system 2900.

In its most basic configuration, computer system 2900 includes various different components. FIG. 29 shows that computer system 2900 includes one or more processor(s) 2905 (aka a "hardware processing unit") and storage 2910.

Regarding the processor(s) 2905, it will be appreciated that the functionality described herein can be performed, at least in part, by one or more hardware logic components (e.g., the processor(s) 2905). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 2900. The different components, modules, engines, and services described herein may be implemented as objects or processors that execute on computer system 2900 (e.g. as separate threads).

Storage 2910 may be physical system memory, which may be volatile, non-volatile, or some combination of the two. The term "memory" may also be used herein to refer to non-volatile mass storage such as physical storage media. If computer system 2900 is distributed, the processing, memory, and/or storage capability may be distributed as well.

Storage 2910 is shown as including executable instructions 2915. The executable instructions 2915 represent instructions that are executable by the processor(s) 2905 of computer system 2900 to perform the disclosed operations, such as those described in the various methods.

The disclosed embodiments may comprise or utilize a special-purpose or general-purpose computer including computer hardware, such as, for example, one or more processors (such as processor(s) 2905) and system memory (such as storage 2910), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2900 may also be connected (via a wired or wireless connection) to external sensors (e.g., one or more remote cameras) or devices via a network 2920. For example, computer system 2900 can communicate with any number devices or cloud services to obtain or process data. In some cases, network 2920 may itself be a cloud network. Furthermore, computer system 2900 may also be connected through one or more wired or wireless networks to remote/separate computer systems(s) that are configured to perform any of the processing described with regard to computer system 2900.

A "network," like network 2920, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2900 will include one or more communication channels that are used to communicate with the network 2920. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for enabling a library of one or more local maps to remain de-coupled from a global map, said method comprising:
    determining that a mixed-reality (MR) system is located on a platform that is currently moving or that has an ability to readily move;
    acquiring at least a threshold amount of scanning data that is representative of at least a portion of the platform;
    based on the acquired scanning data, determining a type for the platform;
    based on the determined type for the platform, generating a three-dimensional (3D) boundary that approximates a shape for the platform's type;
    imposing the 3D boundary onto the platform;
    acquiring additional scanning data that is representative of additional portions of the platform, wherein a bounds of all scanning data that represents the platform is at least initially limited to that of the 3D boundary;
    using the scanning data that represents the platform to build or supplement a library of one or more local maps, wherein the library of one or more local maps is representative of the platform; and
    preventing the library of one or more local maps from being coupled to a global map.

2. The method of claim 1, wherein the method further includes:
    determining that the MR system has left the platform in response to a determination that the MR system has left a confines of the 3D boundary.

3. The method of claim 2, wherein the method further includes:
    subsequent to determining that the MR system has left the platform, re-evaluating whether the MR system is still on the platform, wherein said re-evaluating is performed in response to a determination that the MR system is still moving with a movement of the platform; and
    expanding a size of the 3D boundary based on a determination that the MR system has not left the platform.

4. The method of claim 2, wherein the method further includes:
    after determining that the MR system has left the platform, acquiring new scanning data; and
    preventing the new scanning data from being included in the library of one or more local maps.

5. The method of claim 1, wherein determining that the MR system is located on the platform is based on one or more of motion data or image data.

6. The method of claim 1, wherein determining the type for the platform is based on one or more of motion data or image data.

7. The method of claim 1, wherein a shape of the 3D boundary is (i) a simple shape comprising at least one of: a rectangular prism, a triangular prism, a cylinder, a cone, or a sphere or, alternatively (ii) a custom platform specific shape.

8. The method of claim 1, wherein the scanning data that is representative of the platform is generated by the MR system.

9. The method of claim 1, wherein the library of one or more local maps is merged with a second library of one or more maps, where the second library of one or more maps is also representative of the platform.

10. The method of claim 1, wherein the method further includes:
    acquiring additional scanning data, wherein at least a portion of the additional scanning data represents content that is not a part of the platform; and
    appending a tag onto said portion of the additional scanning data, wherein the tag indicates that said portion of additional scanning data is not representative of the platform and was generated by the MR system while the MR system was within a confines of the 3D boundary.

11. The method of claim 10, wherein the method further includes uploading the tagged scanning data to a map aggregator.

12. The method of claim 10, wherein the method further includes preventing the tagged scanning data from being uploaded to a map aggregator.

13. The method of claim 10, wherein the tagged scanning data is temporarily used for localization purposes but is prevented from being persistently included in the library of one or more local maps.

14. The method of claim 1, wherein the method further includes:
    determining that the MR system is located externally relative to the 3D boundary;

causing the MR system to obtain new scanning data, wherein at least a portion of the new scanning data represents at least a portion of the platform, as bounded by the 3D boundary; and temporarily using said portion of the new scanning data for localization purposes while preventing said portion of the new scanning data from being included in the global map.

15. The method of claim 1, wherein the method further includes:

acquiring new scanning data, wherein at least a portion of the new scanning data represents an object that is outside of the 3D boundary;

determining that the object is moving with the MR system and with the platform; and expanding a size of the 3D boundary to include the object.

16. A computer system that enables a library of one or more local maps to remain de-coupled from a global map, said computer system comprising:

at least one processor; and at least one hardware storage device that stores instructions that are executable by the at least one processor to cause the computer system to:

determine that a mixed-reality (MR) system is located on a platform that is currently moving or that has an ability to readily move;

determine a type for the platform;

based on the determined type for the platform, generate a three-dimensional (3D) boundary that approximates a shape for the platform's type;

impose the 3D boundary onto the platform;

acquire scanning data that is representative of one or more portions of the platform, wherein a bounds of all scanning data that represents the platform is at least initially limited to that of the 3D boundary;

use the scanning data that represents the platform to build or supplement a library of one or more local maps, wherein the library of one or more local maps is representative of the platform; and prevent the library of one or more local maps from being coupled to a global map.

17. The computer system of claim 16, wherein the library of one or more local maps is accessible to a different MR system based on a localization determination.

18. The computer system of claim 16, wherein the computer system is the MR system.

19. The computer system of claim 16, wherein determining the type for the platform is based on one or more of an initial set of scanning data or motion data.

20. A computer system that enables a library of one or more local maps to remain de-coupled from a global map, said computer system comprising:

at least one processor; and at least one hardware storage device that stores instructions that are executable by the at least one processor to cause the computer system to:

determine that a mixed-reality (MR) system is located on a platform that is currently moving;

use motion data associated with the platform to determine a type for the platform;

based on the determined type for the platform, generate a three-dimensional (3D) boundary that bounds the platform;

impose the 3D boundary onto the platform;

acquire scanning data that is representative of one or more portions of the platform, wherein a bounds of the scanning data is at least initially limited to that of the 3D boundary;

use the scanning data to build or supplement a library of one or more local maps, wherein the library of one or more local maps is representative of the platform; and prevent the library of one or more local maps from being coupled to a global map.

* * * * *